(12) United States Patent
Yamada et al.

(10) Patent No.: US 11,515,596 B2
(45) Date of Patent: Nov. 29, 2022

(54) ELECTRICITY-STORAGE MODULE MANUFACTURING METHOD AND ELECTRICITY-STORAGE MODULE

(71) Applicant: KABUSHIKI KAISHA TOYOTA JIDOSHOKKI, Kariya (JP)

(72) Inventors: Masahiro Yamada, Kariya (JP); Kojiro Tamaru, Kariya (JP); Takafumi Yamasaki, Kariya (JP); Takashi Sakai, Kariya (JP); Hiroki Maeda, Kariya (JP); Naoto Morisaku, Kariya (JP); Hiromi Ueda, Kariya (JP); Akihito Tsuge, Kariya (JP); Koji Tsukamoto, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 199 days.

(21) Appl. No.: 16/761,649

(22) PCT Filed: Sep. 11, 2018

(86) PCT No.: PCT/JP2018/033671
§ 371 (c)(1),
(2) Date: May 5, 2020

(87) PCT Pub. No.: WO2019/092980
PCT Pub. Date: May 16, 2019

(65) Prior Publication Data
US 2021/0184301 A1    Jun. 17, 2021

(30) Foreign Application Priority Data

Nov. 10, 2017  (JP) .............................. JP2017-217329
Mar. 15, 2018  (JP) .............................. JP2018-048197

(51) Int. Cl.
*H01M 50/184*   (2021.01)
*H01M 50/193*   (2021.01)
(Continued)

(52) U.S. Cl.
CPC .......... *H01M 50/184* (2021.01); *H01G 11/12* (2013.01); *H01G 11/80* (2013.01);
(Continued)

(58) Field of Classification Search
CPC ........ H01G 11/12; H01G 11/70; H01G 11/78; H01G 11/80; H01G 11/82; H01G 11/84;
(Continued)

(56) References Cited

U.S. PATENT DOCUMENTS

| 9,685,677 B2 | 6/2017 | Shaffer, II et al. |
| 2003/0072998 A1* | 4/2003 | Fredriksson ........ H01M 50/543 429/185 |

(Continued)

FOREIGN PATENT DOCUMENTS

| EP | 1568089 | 8/2005 |
| JP | 2005-005163 A | 1/2005 |

(Continued)

OTHER PUBLICATIONS

International Preliminary Report on Patentability with translation of Written Opinion dated May 22, 2020, in International Application No. PCT/JP2018/033671.

(Continued)

*Primary Examiner* — Victoria H Lynch
(74) *Attorney, Agent, or Firm* — Sughrue Mion, PLLC

(57) ABSTRACT

A method for manufacturing an electricity-storage module includes: preparing a stacked body and first sealing portions; processing an extension portion of one or more first sealing portions included in an outer edge portion in a stacking direction of the stacked body so that an extension portion (Continued)

length of the one or more of first sealing portions becomes shorter than a length of the extension portions of the first sealing portions which are not included in the outer edge portion; and forming a second sealing portion that is provided at the periphery of the first sealing portions when viewed from the stacking direction and covers at least parts of outer surfaces of the first sealing portions located at stacking ends of the stacked body in the stacking direction by injection molding in which a resin material is caused to circulate in a mold frame.

4 Claims, 13 Drawing Sheets

(51) Int. Cl.
  *H01G 11/12* (2013.01)
  *H01G 11/80* (2013.01)
  *H01M 10/0525* (2010.01)
  *H01M 10/0585* (2010.01)
  *H01M 10/34* (2006.01)

(52) U.S. Cl.
  CPC ... *H01M 10/0525* (2013.01); *H01M 10/0585* (2013.01); *H01M 10/345* (2013.01); *H01M 50/193* (2021.01); *H01M 2220/20* (2013.01)

(58) Field of Classification Search
  CPC ......... H01M 10/0413; H01M 10/0463; H01M 10/0486; H01M 10/052; H01M 10/0525; H01M 10/0585; H01M 10/345; H01M 2220/20; H01M 50/184; H01M 50/193; H01M 50/20; H01M 50/502; Y02E 60/10; Y02P 70/50
  See application file for complete search history.

(56) References Cited

U.S. PATENT DOCUMENTS

| | | |
|---|---|---|
| 2004/0253512 A1 | 12/2004 | Watanabe et al. |
| 2010/0151306 A1 | 6/2010 | Fredriksson et al. |
| 2016/0329535 A1 | 11/2016 | Moomaw et al. |

FOREIGN PATENT DOCUMENTS

| | | | |
|---|---|---|---|
| JP | 2005190713 A | | 7/2005 |
| JP | 2006508518 A | | 3/2006 |
| JP | 2017508241 A | | 3/2017 |
| JP | 2019-036514 A | | 3/2019 |
| JP | 2019040792 A | | 3/2019 |
| JP | 2019-061834 A | | 4/2019 |
| WO | 2004051767 A1 | | 6/2004 |
| WO | 2005/048390 A1 | | 5/2005 |

OTHER PUBLICATIONS

Communication dated Feb. 26, 2021, from the Intellectual Property Of India in application No. 202017013982.

* cited by examiner

ELECTRICITY-STORAGE MODULE MANUFACTURING METHOD AND ELECTRICITY-STORAGE MODULE

CROSS REFERENCE TO RELATED APPLICATIONS

This application is a National Stage of International Application No. PCT/JP2018/033671 filed Sep. 11, 2018, claiming priority based on Japanese Patent Application No. 2017-217329 filed Nov. 10, 2017 and Japanese Patent Application No. 2018-048197, Mar. 15, 2018.

TECHNICAL FIELD

An aspect of the invention relates to a method for manufacturing an electricity-storage module and an electricity-storage module.

BACKGROUND ART

As an electricity-storage module in the related art, there is known a so-called bipolar type electricity-storage module including bipolar electrodes in which a positive electrode is formed on one surface of an electrode plate, and a negative electrode is formed on the other surface (refer to Patent Literature 1). The electricity-storage module includes a stacked body obtained by stacking a plurality of bipolar electrodes. A resin group that seals a portion between the bipolar electrodes adjacent to each other in a stacking direction is provided on a side surface of the stacked body. An electrolytic solution is stored in an inner space formed between the adjacent bipolar electrodes.

CITATION LIST

Patent Literature

Patent Literature 1: Japanese Unexamined Patent Publication No. 2005-5163

SUMMARY OF INVENTION

Technical Problem

In the above-described electricity-storage module, it is required to air-tightly secure an inner space formed between adjacent bipolar electrodes to prevent leakage of an electrolytic solution, and the like.

An object of an aspect of the invention is to provide a method for manufacturing an electricity-storage module and an electricity-storage module which are capable of effectively suppressing leakage of an electrolytic solution.

Solution to Problem

According to an aspect of the invention, there is provided a method for manufacturing an electricity-storage module. The method includes: a process of preparing a stacked body obtained by stacking a plurality of bipolar electrodes each including an electrode plate, a positive electrode provided on one surface of the electrode plate, and a negative electrode provided on the other surface of the electrode plate, and a plurality of first sealing portions each being provided at an edge portion of the electrode plate and including an extension portion that extends from an end portion of the electrode plate; a process of processing the extension portion of one or a plurality of the first sealing portions included in an outer edge portion in a stacking direction of the stacked body in such a manner that a length of the extension portion of the one or plurality of first sealing portions becomes shorter than a length of the extension portions of the first sealing portions which are not included in the outer edge portion; and a process of forming a second sealing portion that is provided at the periphery of the first sealing portions when viewed from the stacking direction of the stacked body, and covers at least parts of outer surfaces of the first sealing portions located at stacking ends of the stacked body in the stacking direction by injection molding in which a resin material is caused to circulate in a mold frame.

In the method for manufacturing an electricity-storage module, one or a plurality of the extension portions included in the outer edge portion of the stacked body are processed in such a manner that the length of the extension portion of the one or plurality of first sealing portions becomes shorter than the length of the extension portion of the first sealing portion that is not included in the outer edge portion. According to this, in the extension portion of the one or plurality of first sealing portions included in the outer edge portion, a deformation such as rolling-up is further suppressed in comparison to the extension portion of the first sealing portion that is not included in the outer edge portion. As a result, at the time of the injection molding, the extension portion of the one or plurality of first sealing portions included in the outer edge portion is less likely to be rolled up and to clog a flow passage of the resin material. That is, at the time of the injection molding, a resin material is allowed to easily flow into a space corresponding to a flange portion (in the second sealing portion, a portion that covers at least parts of the outer surfaces of the first sealing portions located at the stacking ends of the stacked body). As described above, according to the method for manufacturing the electricity-storage module, it is possible to form a sealing member (the first sealing portion and the second sealing portion) that seals the side surface of the stacked body with accuracy. According to this, it is possible to appropriately seal a portion between the bipolar electrodes adjacent to each other, and it is possible to effectively suppress leakage of the electrolytic solution.

In the processing process, the extension portions of the plurality of first sealing portions included in the outer edge portion may be heated to join the extension portions adjacent to each other. In this case, since the extension portions adjacent to each other are joined to each other with heat, the strength of the extension portions can be improved. According to this, it is possible to further suppress deformation (peeling-off, rolling-up, or the like) of the extension portions of the first sealing portions included in the outer edge portion due to a pressure of a resin material that flows in at the time of injection molding, and it is possible to effectively suppress clogging of a flow passage of the resin material into a space corresponding to a flange portion.

In the processing process, the extension portions of the plurality of first sealing portions included in the outer edge portion may be processed in such a manner that a length of the extension portions of the first sealing portions becomes shorter as the first sealing portions are closer to the stacking ends. In this case, processing is performed in such a manner that the length of the extension portions (that is, the extension portions of the first sealing portions closer to the stacking ends), which are likely to clog the flow passage of the resin material into the space corresponding to the flange portion, becomes shorter, and thus it is possible to effectively suppress clogging of the flow passage of the resin material into the space corresponding to the flange portion.

End portions of the plurality of first sealing portions included in the outer edge portion may have an R-shape. In this case, it is possible to effectively improve the pressure-resistant performance of the electricity-storage module.

According to another aspect of the invention, there is provided an electricity-storage module including: a stacked body that is obtained by stacking a plurality of bipolar electrodes each including an electrode plate, a positive electrode provided on one surface of the electrode plate, and a negative electrode provided on the other surface of the electrode plate; a plurality of first sealing portions each being provided at an edge portion of the electrode plate and including an extension portion that extends from an end portion of the electrode plate; and a second sealing portion that is provided at the periphery of the plurality of first sealing portions when viewed from the stacking direction of the stacked body, and covers at least parts of outer surfaces of the first sealing portions located at stacking ends of the stacked body in the stacking direction. A length of the extension portion of the one or the plurality of first sealing portions included in an outer edge portion in a stacking direction of the stacked body is shorter than a length of the extension portion of the first sealing portions which are not included in the outer edge portion.

In the electricity-storage module, the length of the extension portion of the one or plurality of first sealing portions included in the outer edge portion of the stacked body becomes shorter than the length of the extension portion of the first sealing portion that is not included in the outer edge portion. According to this, at the time of manufacturing the electricity-storage module, in the extension portion of the one or plurality of first sealing portions included in the outer edge portion, a deformation such as rolling-up is further suppressed in comparison to the extension portion of the first sealing portion that is not included in the outer edge portion. As a result, at the time of the injection molding, the extension portion of the one or plurality of first sealing portions included in the outer edge portion is less likely to be rolled up and to clog a flow passage of the resin material. That is, at the time of the injection molding, a resin material is allowed to easily flow into a space corresponding to the flange portion (in the second sealing portion, a portion that covers at least parts of the outer surfaces of the first sealing portions located at the stacking ends of the stacked body). As described above, according to the electricity-storage module, it is possible to form a sealing member (the first sealing portion and the second sealing portion) that seals the side surface of the stacked body with accuracy. According to this, it is possible to appropriately seal a portion between the bipolar electrodes adjacent to each other, and it is possible to effectively suppress leakage of the electrolytic solution.

According to still another aspect of the invention, there is provided an electricity-storage module including: a stacked body that is obtained by stacking a plurality of electrodes; and a sealing portion that is provided in the stacked body to surround edge portions of the electrodes when viewed from a stacking direction of the stacked body. The electrodes include a plurality of bipolar electrodes, a negative terminal electrode, and a positive terminal electrode. Each of the bipolar electrodes includes an electrode plate, a positive electrode provided on a first surface of the electrode plate, and a negative electrode provided on a second surface of the electrode plate which is opposite to the first surface. The negative terminal electrode includes the electrode plate and a negative electrode provided on the second surface of the electrode plate, and is disposed at one end of the stacked body in the stacking direction in such a manner that the second surface is located on an inner side of the stacked body. The positive terminal electrode includes the electrode plate and a positive electrode provided on the first surface of the electrode plate, and is disposed at the other end of the stacked body in the stacking direction in such a manner that the first surface is located on an inner side of the stacked body. The sealing portion includes a plurality of first sealing portions which are respectively provided at edge portions of the plurality of electrodes, and a second sealing portion that is joined to the first sealing portions to surround the plurality of first sealing portions when viewed from the stacking direction. The second sealing portion includes a first flange portion that is in contact with a first terminal sealing portion that is one of the first sealing portions which is provided at an edge portion of the negative terminal electrode at one end of the stacked body, and includes a portion that overlaps the first terminal sealing portion when viewed from the stacking direction, and a second flange portion that is in contact with a second terminal sealing portion that is one of the first sealing portions which is provided at an edge portion of the positive terminal electrode at the other end of the stacked body, and includes a portion that overlaps the second terminal sealing portion when viewed from the stacking direction. At least one set between a set of the first flange portion and the negative terminal electrode, and a set of the second flange portion and the positive terminal electrode includes portions overlapping each other when viewed from the stacking direction.

When being used, the electricity-storage module generates a gas at the inside thereof. An inner pressure inside the electricity-storage module is raised due to the gas. When the inner pressure is raised, at an outermost layer of the stacked body (one end or the other end of the stacked body), a pressure is applied from an inner side to an outer side along the stacking direction. In this case, among members disposed in the outermost layer of the stacked body, the first sealing portion (the first terminal sealing portion or the second terminal sealing portion) having relatively low strength becomes a weak portion. In addition, for example, when the weak portion receives the pressure and is deformed from the inner side to the outer side, there is a high possibility that the electrolytic solution stored inside the electricity-storage module may be leaked from the deformed portion. On the other hand, in the electricity-storage module according to still another aspect of the invention, at least one set between the set of the first flange portion and the negative terminal electrode, and the set of the second flange portion and the positive terminal electrode includes portions overlapping each other when viewed from the stacking direction of the stacked body. That is, in at least one of the two sets, respective members (the set of the first flange portion and the negative terminal electrode or the set of the second flange portion and the positive terminal electrode) are disposed so as not to receive the pressure only with the weak portion (the first terminal sealing portion or the second terminal sealing portion). According to this, the pressure-resistant strength of the electricity-storage module is improved, and the possibility of leakage of the electrolytic solution as described above is reduced. Accordingly, according to the electricity-storage module, it is possible to effectively suppress leakage of the electrolytic solution.

In the electricity-storage module, at least the first flange portion and the negative terminal electrode may include portions overlapping each other when viewed from the stacking direction. In the electricity-storage module in which an aqueous alkali solution is used as the electrolytic solution, leakage of the electrolytic solution is likely to occur from the negative-electrode side end (the other end) of the stacked body due to a so-called alkali creep phenomenon. According to the above-described configuration, the binding pressure can be raised by improving the pressure-resistant strength at the negative-electrode side end of the electricity-storage module, and thus it is possible to further suppress leakage of the electrolytic solution.

Advantageous Effects of Invention

According to the aspects of the invention, it is possible to provide a method for manufacturing an electricity-storage module and an electricity-storage module which are capable of effectively suppressing leakage of an electrolytic solution.

DESCRIPTION OF EMBODIMENTS

Figure 1:
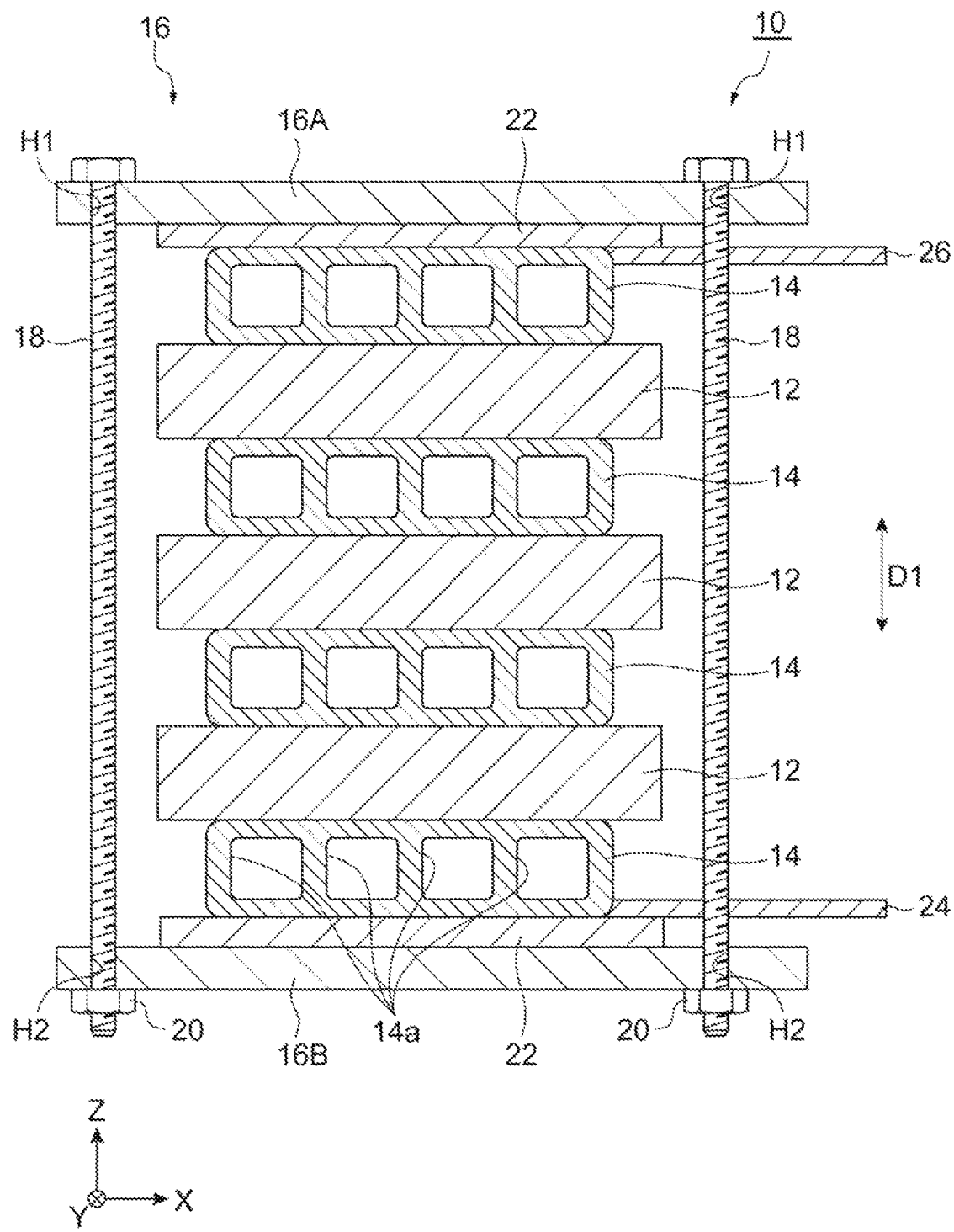
FIG. 1 is a schematic cross-sectional view illustrating an embodiment of an electricity-storage device including an electricity-storage module.

Hereinafter, embodiments of the invention will be described in detail with reference to the accompanying drawings. In description of the drawings, the same reference numeral will be given to the same or equivalent element, and redundant description thereof will be omitted. In the drawings, an XYZ orthogonal coordinate system is illustrated.

First Embodiment

[Configuration of Electricity-Storage Device]

FIG. 1 is a schematic cross-sectional view illustrating an embodiment of an electricity-storage device including an electricity-storage module. An electricity-storage device 10 illustrated in the same drawing can be used, for example, as batteries of various vehicles such as a forklift, a hybrid car, and an electric vehicle. The electricity-storage device 10 include a plurality of (three in this embodiment) electricity-storage modules 12, but may include a single electricity-storage module 12. For example, each of the electricity-storage modules 12 is a bipolar battery. For example, the electricity-storage module 12 is a secondary battery such as a nickel-hydrogen secondary battery and a lithium ion secondary battery, but may be an electric double-layer capacitor. In the following description, the nickel-hydrogen secondary battery will be exemplified.

The plurality of electricity-storage modules 12 are stacked, for example, through a conductive plate 14 such as a metal plate. For example, the electricity-storage modules 12 and the conductive plate 14 have a rectangular shape when viewed from a stacking direction D1 (Z-direction). Details of the electricity-storage modules 12 will be described later. The conductive plate 14 is also disposed on an outer side of the electricity-storage modules 12 located on both ends in the stacking direction D1 of the electricity-storage modules 12. The conductive plate 14 is electrically connected to adjacent electricity-storage modules 12. According to this, the plurality of electricity-storage modules 12 are serially connected in the stacking direction D1. In the stacking direction D1, a positive electrode terminal 24 is connected to the conductive plate 14 that is located at one end in the stacking direction D1, and a negative electrode terminal 26 is connected to the conductive plate 14 that is located at the other end. The positive electrode terminal 24 may be formed integrally with the conductive plate 14 that is connected thereto. The negative electrode terminal 26 may be formed integrally with the conductive plate 14 that is connected thereto. The positive electrode terminal 24 and the negative electrode terminal 26 extend in a direction (X-direction) that intersects the stacking direction D1. Charging and discharging of the electricity-storage device 10 can be carried out by the positive electrode terminal 24 and the negative electrode terminal 26.

The conductive plate 14 can function as a heat dissipation plate for emitting heat generated in each of the electricity-storage modules 12. When a coolant such as air passes through a plurality of cavities 14a provided inside the conductive plate 14, heat can be effectively emitted from the electricity-storage modules 12 to the outside. For example, the cavities 14a extend in a direction (Y-direction) that intersects the stacking direction D1. The conductive plate 14 is smaller than the electricity-storage module 12 when viewed from the stacking direction D1, but may be the same as or greater than the electricity-storage module 12.

The electricity-storage device 10 may include a binding member 16 that binds the electricity-storage module 12 and the conductive plate 14 which are alternately stacked in the stacking direction D1. The binding member 16 includes a pair of binding plates 16A and 16B, and a connection member (a bolt 18 and a nut 20) that connects the binding plates 16A and 16B. For example, an insulating film 22 such as a resin film is disposed between each of the binding plates 16A and 16B, and the conductive plate 14. For example, the binding plates 16A and 16B are constituted by a metal such iron. For example, the binding plates 16A and 16B and the insulating film 22 have a rectangular shape when viewed from the stacking direction D1. The insulating film 22 is larger than the conductive plate 14, and the binding plates 16A and 16B are larger than the electricity-storage module 12. When viewed from the stacking direction D1, an insertion hole H1 into which a shaft portion of the bolt 18 is inserted is provided in an edge portion of the binding plate 16A at a position on an outer side in comparison to the electricity-storage module 12. Similarly, when viewed from the stacking direction D1, an insertion hole H2 into which a shaft portion of the bolt 18 is inserted is provided in an edge portion of the binding plate 16B at a position on an outer side of the electricity-storage module 12. In a case where the binding plates 16A and 16B have a rectangular shape when viewed from the stacking direction D1, the insertion hole H1 and the insertion hole H2 are located at corner portions of the binding plates 16A and 16B.

One binding plate 16A abuts on the conductive plate 14 connected to the negative electrode terminal 26 through the insulating film 22, and the other binding plate 16B abuts on the conductive plate 14 connected to the positive electrode terminal 74 through the insulating film 22. For example, the bolt 18 passes through the insertion hole H1 from the one binding plate 16A side to the other binding plate 16B side, and the nut 20 is screwed to a tip end of the bolt 18 that protrudes from the other binding plate 16B. According to this, the insulating film 22, the conductive plate 14, and the electricity-storage module 12 are sandwiched to form a unit, and a binding load is applied in the stacking direction D1.

Figure 2:
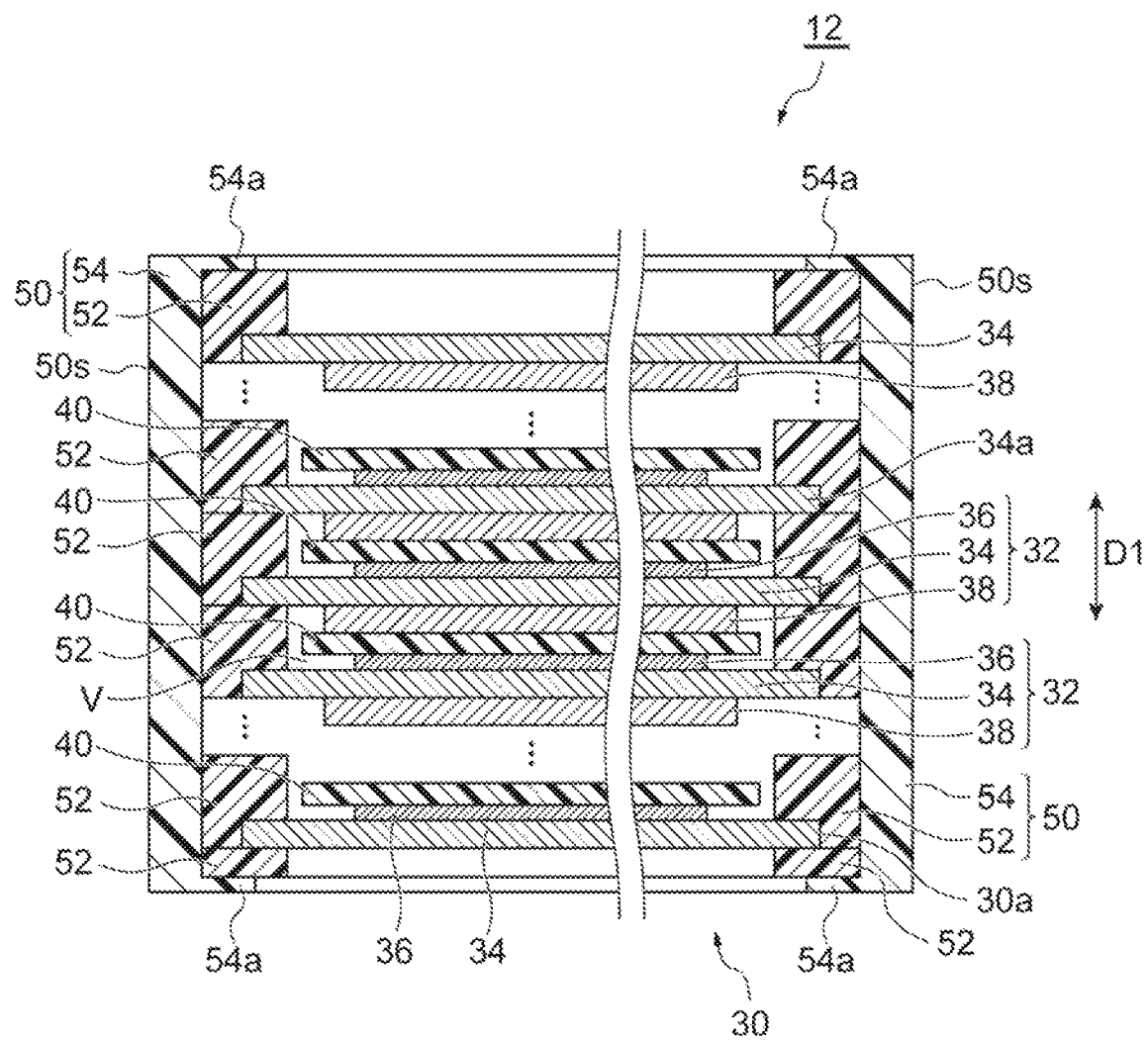
FIG. 2 is a schematic cross-sectional view illustrating an embodiment of an electricity-storage module according to a first embodiment.
Figure 3:
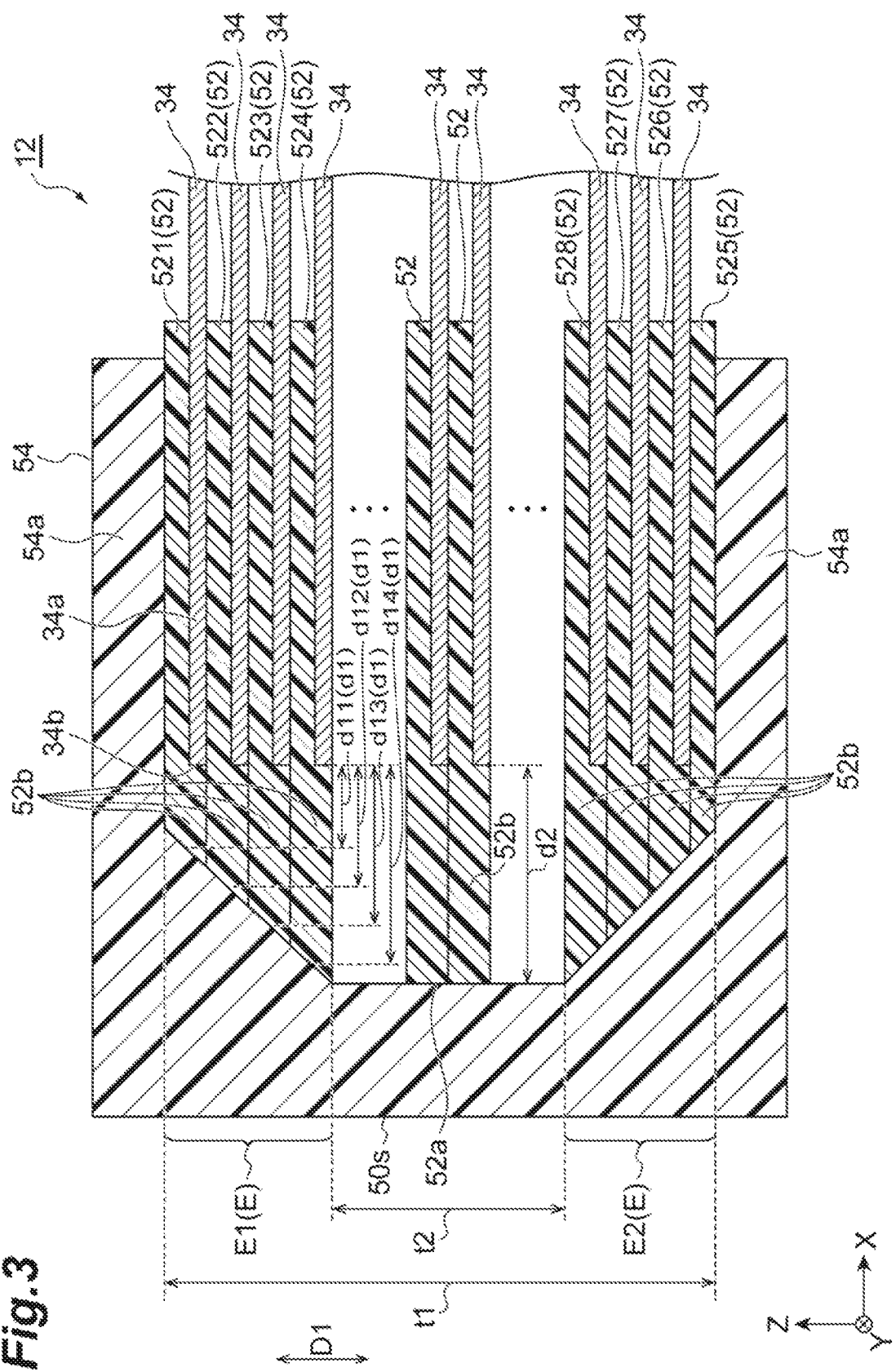
FIG. 3 is an enlarged cross-sectional view of a main portion of the electricity-storage module illustrated in FIG. 2.

FIG. 2 is a schematic cross-sectional view illustrating the electricity-storage module 12. FIG. 3 is an enlarged cross-sectional view of a main portion of the electricity-storage module 12. Specifically, FIG. 3 is an enlarged view illustrating a portion on one side (a left side illustrated in FIG. 2) in the X-direction in outer edge portions (an upper edge portion and a lower edge portion) of a stacked body that constitutes the electricity-storage module in the stacking direction D1 by enlarging the portion. Note that, in FIG. 2 illustrating a schematic configuration of the electricity-storage module, a detailed configuration (a configuration of an outer edge portion E illustrated in FIG. 3) of an outer edge portion of the stacked body is not illustrated in the drawing.

As illustrated in FIG. 2 and FIG. 3, the electricity-storage module 12 includes a stacked body 30 in which a plurality of bipolar electrodes (electrodes) 32 are stacked. For example, the stacked body 30 has a rectangular shape when viewed from the stacking direction D1 of the bipolar electrodes 32. A separator 40 may be disposed between the bipolar electrodes 32 adjacent to each other. Each of the bipolar electrodes 32 includes an electrode plate 34, a positive electrode 36 provided on one surface of the electrode plate 34, and a negative electrode 38 provided on the other surface of the electrode plate 34. In the stacked body 30, the positive electrode 36 of one of the bipolar electrodes 32 faces the negative electrode 38 of one bipolar electrode 32 that is adjacent in the stacking direction D1 with the separator 40 interposed therebetween, and the negative electrode 38 of the one bipolar electrode 32 faces the positive electrode 36 of the other bipolar electrode 32 that is adjacent in the stacking direction D1 with the separator 40 interposed therebetween. In the stacking direction D1, an electrode plate 34 (negative terminal electrode) in which the negative electrode 38 is disposed on an inner surface is disposed at one end of the stacked body 30, and an electrode plate 34 (positive terminal electrode) in which the positive electrode 36 is disposed on an inner surface is disposed at the other end of the stacked body 30. The negative electrode 38 of the negative terminal electrode faces the positive electrode 36 of the bipolar electrode 32 in the uppermost layer through the separator 40. The positive electrode 36 of the positive terminal electrode faces the negative electrode 38 of the bipolar electrode 32 in the lowest layer through the separator 40. Each of the electrode plates 34 of the terminal electrodes is respectively connected to the adjacent conductive plate 14 (refer to FIG. 1).

The electricity-storage module 12 includes a frame 50 that holds an edge portion 34a of the electrode plate 34 at a side surface 30a of the stacked body 30 which extends in the stacking direction D1. The frame 50 is provided at the periphery of the stacked body 30 when viewed from the stacking direction D1. Specifically, the frame 50 is configured to surround the side surface 30a of the stacked body 30. The frame 50 includes a plurality of first sealing portions 52 each being provided at the edge portion 34a of the electrode plate 34 and including an extension portion 52b that extends from the end portion 34b of the electrode plate 34, and a second sealing portion 54 that is provided at the periphery of the plurality of first sealing portions 52 when viewed from the stacking direction D1.

Each of the first sealing portions 52 which constitute an inner wall of the frame 50 is provided over an end surface of the electrode plate 34 at the edge portion 34a from one surface (here, a surface on which the positive electrode 36 is formed) of the electrode plate 34 of each of the bipolar electrodes 32. When viewed from the stacking direction D1, each of the first sealing portions 52 is provided over the entire periphery of the edge portion 34a of the electrode plate 34 of the bipolar electrode 32. The first sealing portions 52 adjacent to each other are in contact with each other on a surface that extends to an outer side from the other surface (here, a surface on which the negative electrode 38 is formed) of the electrode plate 34 of the bipolar electrode 32. As a result, the edge portion 34a of the electrode plate 34 of the bipolar electrode 32 is buried and held in the first sealing portion 52. As in the edge portion 34a of the electrode plate 34 of the bipolar electrode 32, edge portions 34a of the electrode plates 34 disposed on both ends of the stacked body 30 are also held in a state of being buried in the first sealing portion 52. Specifically, with regard to the positive terminal electrode, the first sealing portion 52 is also provided on an outer surface (surface connected to the conductive plate 14) of the positive terminal electrode. That is, the edge portion 34a of the positive terminal electrode is held in a state of being buried in the first sealing portion 52 (the first sealing portion 52 provided at the bottom in FIG. 2) provided on an outer surface of the positive terminal electrode and the first sealing portion 52 provided on one surface of the positive terminal electrode. An inner space V, which is air-tightly partitioned by the electrode plates 34 and 34 adjacent to each other in the stacking direction D1 and the first sealing portion 52, is formed between the electrode plates 34 and 34. For example, the inner space V stores an electrolytic solution (not illustrated) composed of an alkali solution such as an aqueous solution of potassium hydroxide.

The second sealing portion 54 that constitutes an outer wall of the frame 50 is a tubular portion that extends with the stacking direction D1 set as an axial direction. The second sealing portion 54 extends over the entire length of the stacked body 30 in the stacking direction D1. The second sealing portion 54 covers an outer surface of the first sealing portion 52 that extends in the stacking direction D1. The second sealing portion 54 is formed by injection molding to be described later. The second sealing portion 54 includes a rectangular annular flange portion 54a that extends to an inner side at both ends in the stacking direction D1. The flange portion 54a is a portion that covers at least a part of the outer surface of the first sealing portion 52 located at a stacking end of the stacked body 30 in the stacking direction D1. The stacked body 30 is sandwiched by the flange portions 54a formed at the both ends in the stacking direction D1.

For example, the electrode plate 34 is a rectangular metal foil formed from nickel. Alternatively, the electrode plate 34 may be a nickel plated steel plate. The edge portion 34a of the electrode plate 34 is an uncoated region that is not coated with a positive electrode active material and a negative electrode active material, and the uncoated region is a region that is buried and held in the first sealing portion 52 that constitutes the inner wall of the frame 50. Examples of the positive electrode active material that constitutes the positive electrode 36 include nickel hydroxide. Examples of the negative electrode active material that constitutes the negative electrode 38 include a hydrogen occluding alloy. A formation region of the negative electrode 38 on the other surface of the electrode plate 34 is slightly larger than a formation region the positive electrode 36 on one surface of the electrode plate 34.

For example, the separator 40 is formed in a sheet shape. Examples of a material for forming the separator 40 include a porous film formed from a polyolefin-based resin such as polyethylene (PE) and polypropylene (PP), woven or non-woven fabric formed from polypropylene, and the like. In addition, the separator 40 may be reinforced with a vinylidene fluoride resin compound or the like. Note that, the separator 40 is not limited to the sheet shape, and a bag-shaped separator may be used.

Examples of a resin material that constitutes the frame 50 include polypropylene (PP), polyphenylene sulfide (PPS), modified polyphenylene ether (modified PPE), and the like.

As illustrated in FIG. 3, a length d1 of the extension portion 52b of one or a plurality of the first sealing portions 52 included in the outer edge portion E in the stacking direction D1 of the stacked body 30 is shorter than a length d2 of the extension portion 52b of the first sealing portion 52 that is not included in the outer edge portion E. Here, the length of the extension portion 52b is a length from the end portion 34b of the electrode plate 34 to the end portion 52a of the extension portion 52b (that is, a tip end of the first sealing portion 52). In addition, the outer edge portion E is a part on an outer side in the stacking direction D1 of the stacked body 30, and is a portion that includes at least the outermost electrode plate 34 (the positive terminal electrode or the negative terminal electrode) in the stacked body 30. In this embodiment, as an example, the outer edge portion E1 including the negative terminal electrode includes the negative terminal electrode and three electrode plates 34 adjacent to the negative terminal electrode. An outer edge portion E2 including the positive terminal electrode includes the positive terminal electrode, and three electrode plates 34 adjacent to the positive terminal electrode.

In this embodiment, as an example, a corner portion in the outer edge portion E1 formed by a plurality of (here, four) first sealing portions 52 has a chamfered shape. The chamfered shape is formed as follows. Specifically, in a region including an extension portion 52b of a first sealing portion 521 provided in the negative terminal electrode before processing, and extension portions 52b of three first sealing portions 522 to 524 provided in three electrode plates 34 adjacent to the negative terminal electrode before processing, a right-angled isosceles triangular region corresponding to a corner of the region is removed to form the chamfered shape. According to this, lengths d11 to d14 of the extension portions 52b of the first sealing portions 521 to 524 (here, average lengths as an example (that is, lengths of the extension portions 52b at central portions in the stacking direction D1)) are shorter than the length d2 of the extension portion 52b of the first sealing portion 52 that is not included in the outer edge portion E. In addition, a width t1 of a portion where the plurality of first sealing portions 52 and the plurality of electrode plates 34 overlap each other in the stacking direction D1 in the stacked body 30 is larger than a width t2 of an outer end of a portion where the extension portions 52b of the plurality of first sealing portions 52 overlap each other in the stacking direction D1 in the stacked body 30.

A configuration in the outer edge portion E2 of the electricity-storage module 12 is the same as the configuration in the outer edge portion E1. Specifically, as illustrated in FIG. 3, the configuration in the outer edge portion E2 of the electricity-storage module 12 is a configuration that is substantially symmetric to the configuration in the outer edge portion E1 of the electricity-storage module 12. That is, a corner portion in the outer edge portion E2 formed by a plurality of (here, four) first sealing portions has a chamfered shape as in the corner portion in the outer edge portion E1. The shape is formed as follows. Specifically, in a region including extension portions 52b of first sealing portion 525 and 526 provided in the positive terminal electrode before processing, and extension portions 52b of two first sealing portions 527 and 528 provided in two electrode plates 34 adjacent to the positive terminal electrode before processing, a right-angled isosceles triangular region corresponding to a corner of the region is removed to form the chamfered shape. According to this, lengths of the extension portions 52b of the first sealing portions 525 to 528 are shorter than the length d2 of the extension portion 52b of the first sealing portion 52 that is not included in the outer edge portion E.

[Method for Manufacturing Electricity-Storage Device]

Next, an example of a method for manufacturing the electricity-storage device 10 illustrated in FIG. 1 (including a method for manufacturing the electricity-storage module 12) will be described with reference to FIG. 4 to FIG. 6.

(Preparation Process)

Figure 4:
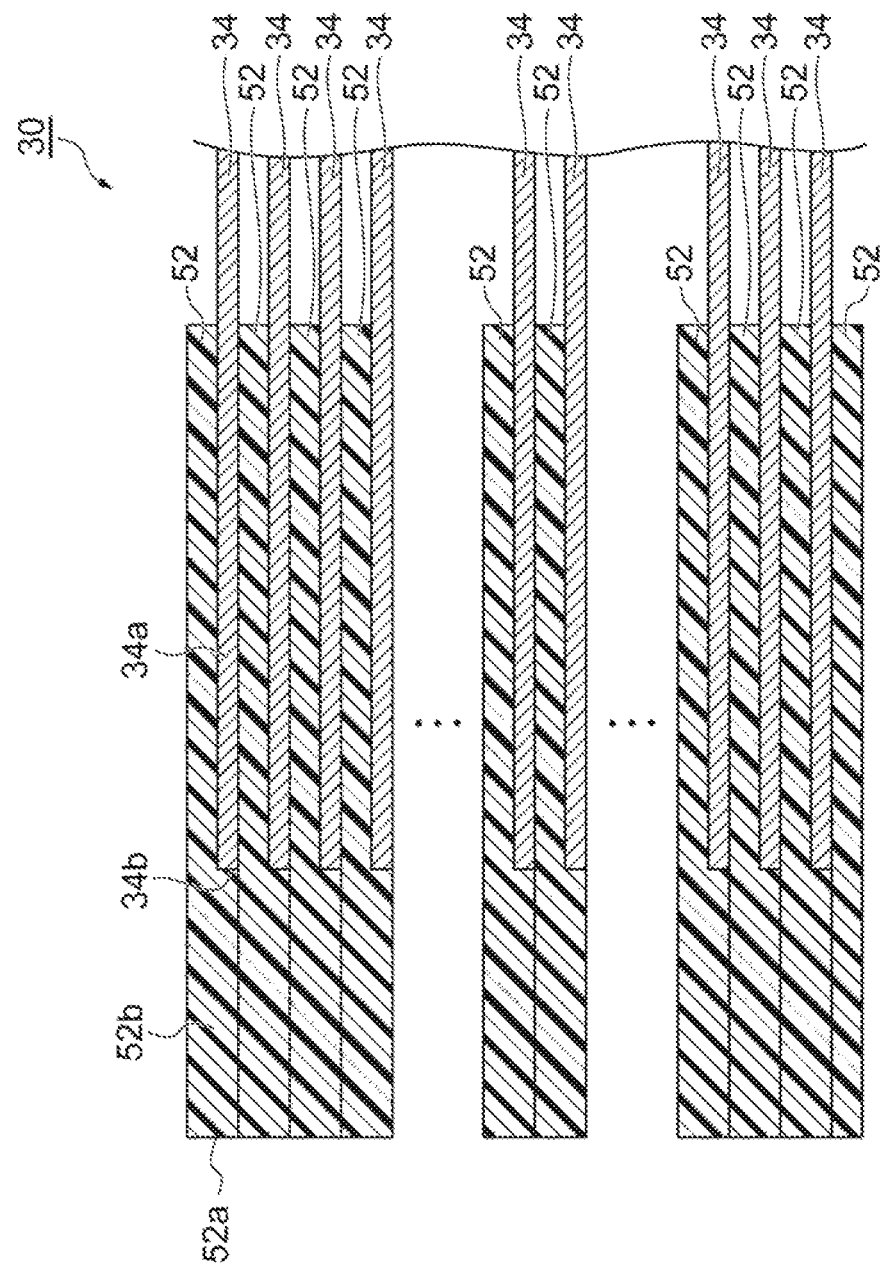
FIG. 4 is a view for describing a process of manufacturing the electricity-storage module illustrated in FIG. 2.

First, as illustrated in FIG. 4, the stacked body 30 and the plurality of first sealing portions 52 are prepared. For example, a plurality of bipolar electrodes 32 in which each of the first sealing portions 52 is formed in advance in the edge portion 34a of the electrode plate 34 are stacked through the separator 40 to obtain the stacked body 30. For example, the stacked body 30 is formed by aligning positions of the end portions 52a of the plurality of first sealing portions 52 and by stacking the plurality of bipolar electrodes 32 and a plurality of the separators 40. According to this, the stacked body 30 in which the positions of the end portions 52a of the plurality of first sealing portions 52 are aligned is obtained.

(Processing Process)

Figure 5:
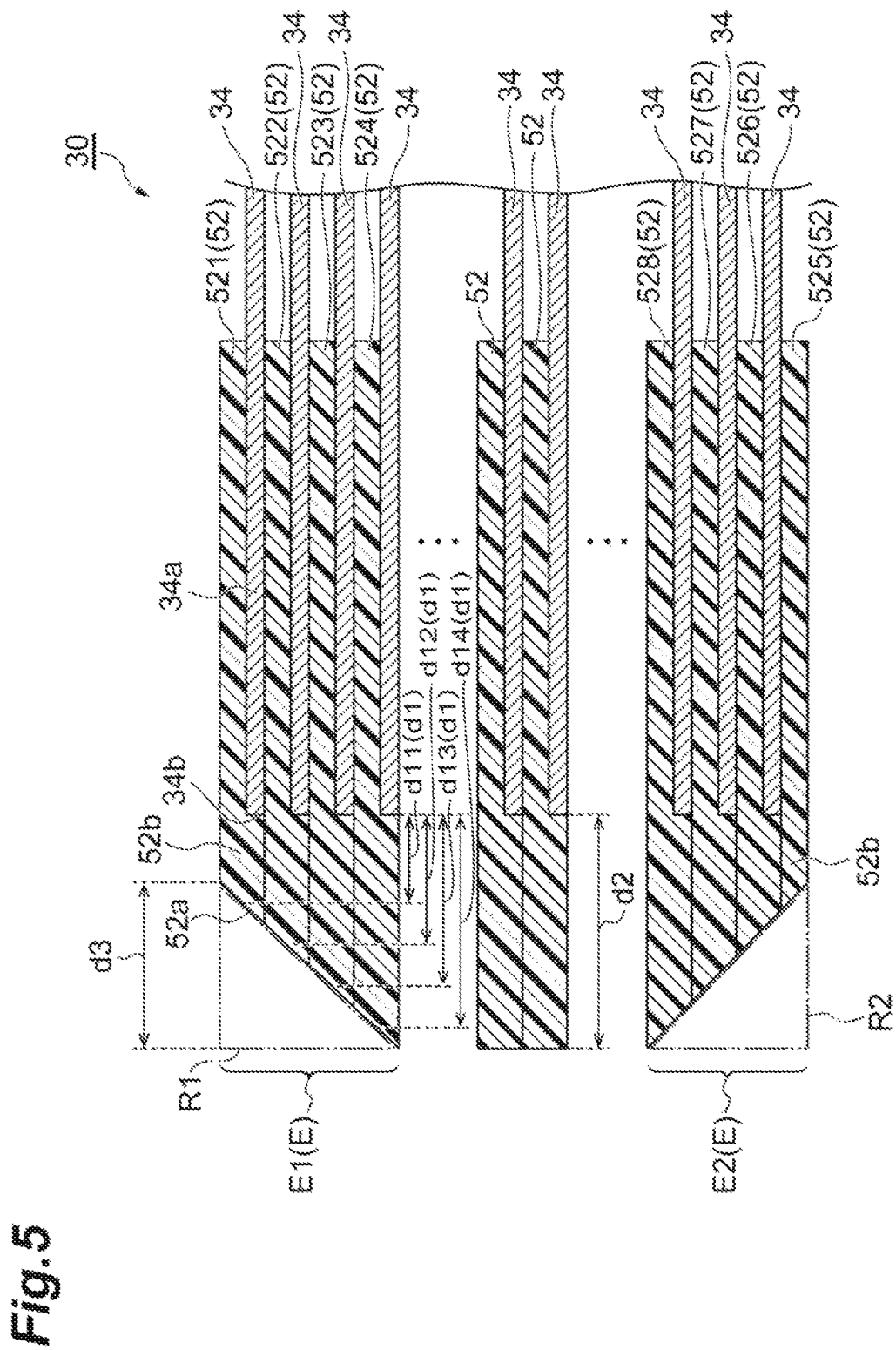
FIG. 5 is a view for describing a process of manufacturing the electricity-storage module illustrated in FIG. 2.

Next, as illustrated in FIG. 5, the extension portion 52b of one or a plurality of the first sealing portions 52 included in the outer edge portion E (the outer edge portion E1 and the outer edge portion E2) in the stacking direction D1 of the stacked body 30 is processed. Specifically, the extension portion 52b of the one or plurality of first sealing portions 52 is processed in such a manner that the length of the extension portion 52b of the one or plurality of first sealing portions 52 (here, the four first sealing portions 521 to 524) included in the outer edge portion E1 becomes shorter than the length d2 of the extension portion 52b of the first sealing portion 52 that is not included in the outer edge portion E. Here, as an example, in a region including the extension portions 52b of the first sealing portions 521 to 524 before processing, a right-angled isosceles triangular region R1 corresponding to a corner of the region is removed.

The chamfered shape (here, the region R1) is arbitrarily determined to a certain extent in which the edge portion 34a of the electrode plate 34 is not exposed (that is, an extent of maintaining a state in which the edge portion 34a of the electrode plate 34 is covered with the first sealing portion 52). For example, with regard to a length d3 of one side other than an oblique side in the region R1, a predetermined ratio (for example, three-fourths) of the length d2 (the amount of protrusion from the end portion 34b of the extension portion 52b) that is determined in advance as a design value may be determined as an upper limit. For example, in a case where d2 is 2 mm, 1.5 mm that is three-fourths of the length d2 may be set as the upper limit of the length d3. In this case, the end portion 52a of the plurality of first sealing portions 52 in the outer edge portion E1 becomes a C-surface that is processed by C1.5. Note that, the number of the first sealing portions 52 which form the chamfered shape may vary depending on the magnitude of the length d3. For example, in the example illustrated in FIG. 5, the chamfered shape (region R1) is formed by four first sealing portions 52, but in a case where the length d3 is set to be shorter, the chamfered shape may be formed by one to three first sealing portions 52.

Here, for example, the chamfered shape (region R1) can be formed by heating end portions of the extension portions 52b of the first sealing portions 521 to 524 before processing. For example, in a region including the extension portions 52b of the first sealing portions 521 to 524 before processing, a region corresponding to the region R1 is removed through heating and melting. In this case, the extension portions 52b of the first sealing portions 52 adjacent to each other are fixed (welded) due to heat, and the strength of the extension portion 52b included in the outer edge portion E1 can be improved. According to this, it is possible to suppress deformation (peeling-off, rolling-up, or the like) of the extension portions 52b due to a pressure of a resin material RM that flows in at the time of an injection molding process to be described later.

In addition, in this embodiment, as an example, the extension portions 52b of the four first sealing portions 52 (first sealing portions 521 to 524) included in the outer edge portion E1 are processed by a chamfering process as described above in such a manner that the length of the extension portions 52b of the first sealing portions 52 becomes shorter as the first sealing portions 52 are closer to the stacking end of the stacked body 30. Specifically, with regard to the lengths d11 to d14 of the extension portions 52b of the first sealing portions 521 to 524, a relationship of "d11<d12<d13<d14" is established.

The outer edge portion E2 is processed in a similar manner as in the outer edge portion E1. That is, the extension portions 52b of one or a plurality of first sealing portions 52 are processed in such a manner that the length of the extension portions 52b of the one or plurality of first sealing portions 52 (here, four first sealing portions 525 to 528) included in the outer edge portion E2 becomes shorter than the length d2 of the extension portions 52b of the first sealing portions 52 that is not include in the outer edge portion E. Specifically, in a region including the extension portions 52b of the first sealing portions 525 to 528 before processing, a right-angled isosceles triangular region R2 corresponding to a corner of the region is removed by a processing process similar to the processing process with respect to the outer edge portion E1 as described above.

(Injection Molding Process)

Figure 6:
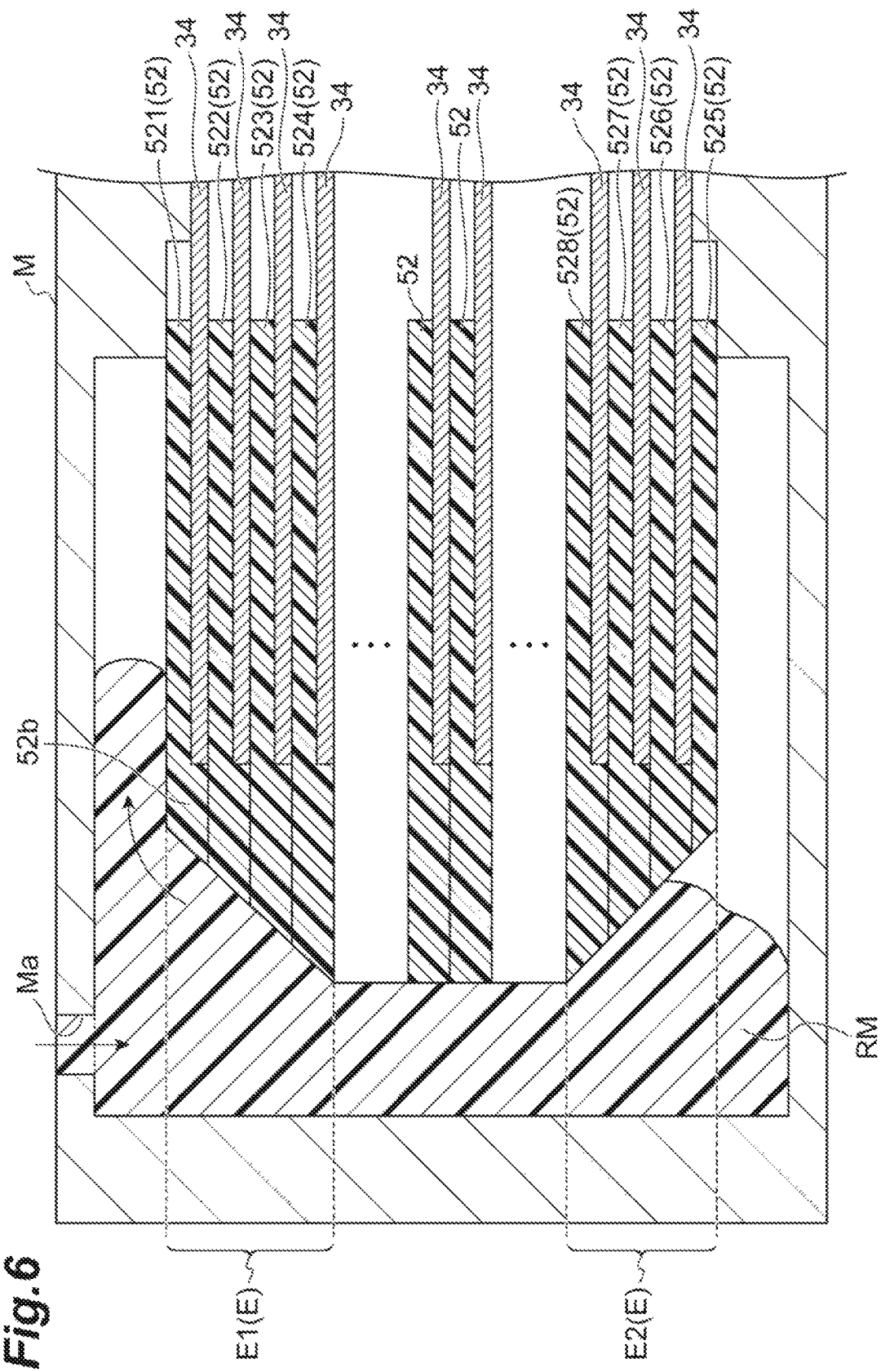
FIG. 6 is a view for describing the process of manufacturing the electricity-storage module illustrated in FIG. 2.

Next, as illustrated in FIG. 6, an injection molding in which the resin material RM is caused to circulate in a mold frame M is executed. When the resin material RM flows into a space formed between the mold frame M and the plurality of first sealing portions 52 through an opening Ma provided in the mold frame M, the second sealing portion 54 (refer to FIG. 3) is formed. Through the injection molding, the second sealing portion 54 is formed in such a manner that the second sealing portion 54 covers at least parts of outer surfaces of the first sealing portions 52 (here, the first sealing portion 521 provided in the negative terminal electrode and the first sealing portion 525 provided in the positive terminal electrode) located at the stacking ends of the stacked body 30 in the stacking direction D1. That is, the second sealing portion 54 including the flange portion 54a (refer to FIG. 3) is formed by the injection molding.

[Operation and Effect of First Embodiment]

As described above, the method for manufacturing the electricity-storage module according to this embodiment includes a process of preparing the stacked body 30 and the plurality of first sealing portions 52 (preparation process), a process of processing the extension portions 52b of one or a plurality of first sealing portions 52 in such a manner that the length d1 of the extension portion 52b of the one or plurality of first sealing portion 52 included in the outer edge portion E in the stacking direction D1 of the stacked body 30 becomes shorter than the length d2 of the extension portion 52b of the first sealing portion 52 that is not included in the outer edge portion E (processing process), and a process of forming the second sealing portion 54 that is provided at the periphery of the first sealing portions 52 when viewed from the stacking direction D1 by the injection molding in which the resin material RM is caused to circulate in the mold frame M, and covers at least parts of outer surfaces of the first sealing portions 52 located at the stacking ends of the stacked body 30 in the stacking direction (injection molding process).

In the method for manufacturing the electricity-storage module, the one or plurality of extension portions 52b (in this embodiment, the extension portions 52b of the four first sealing portions 521 to 524 included in the outer edge portion E1, and the extension portions 52b of the four first sealing portions 525 to 528 included in the outer edge portion E2 as an example) are processed in such a manner that the length d1 of the extension portions 52b of the one or plurality of first sealing portions 52 included in the outer edge portion E of the stacked body 30 becomes shorter than the length d2 of the extension portion 52b of the first sealing portion 52 that is not included in the outer edge portion E. Here, in the extension portions 52b of the one or plurality of first sealing portions 52 included in the outer edge portion E, deformation such as rolling up is further suppressed in comparison to the extension portion 52b of the first sealing portion 52 that is not included in the outer edge portion E. As a result, at the time of the injection molding, the extension portions 52b of the one or plurality of first sealing portions 52 included in the outer edge portion E of the stacked body 30 are less likely to be rolled up and to clog a flow passage of the resin material RM. That is, at the time of the injection molding, the resin material RM is allowed to easily flow into a space corresponding to the flange portion 54a (in the second sealing portion 54, a portion that covers at least parts of the outer surfaces of the first sealing portions 52 located at the stacking ends of the stacked body 30). As described above, according to the method for manufacturing the electricity-storage module, it is possible to form a sealing member (the first sealing portion 52 and the second sealing portion 54) that seals the side surface 30*a* of the stacked body 30 with accuracy.

Figure 7:
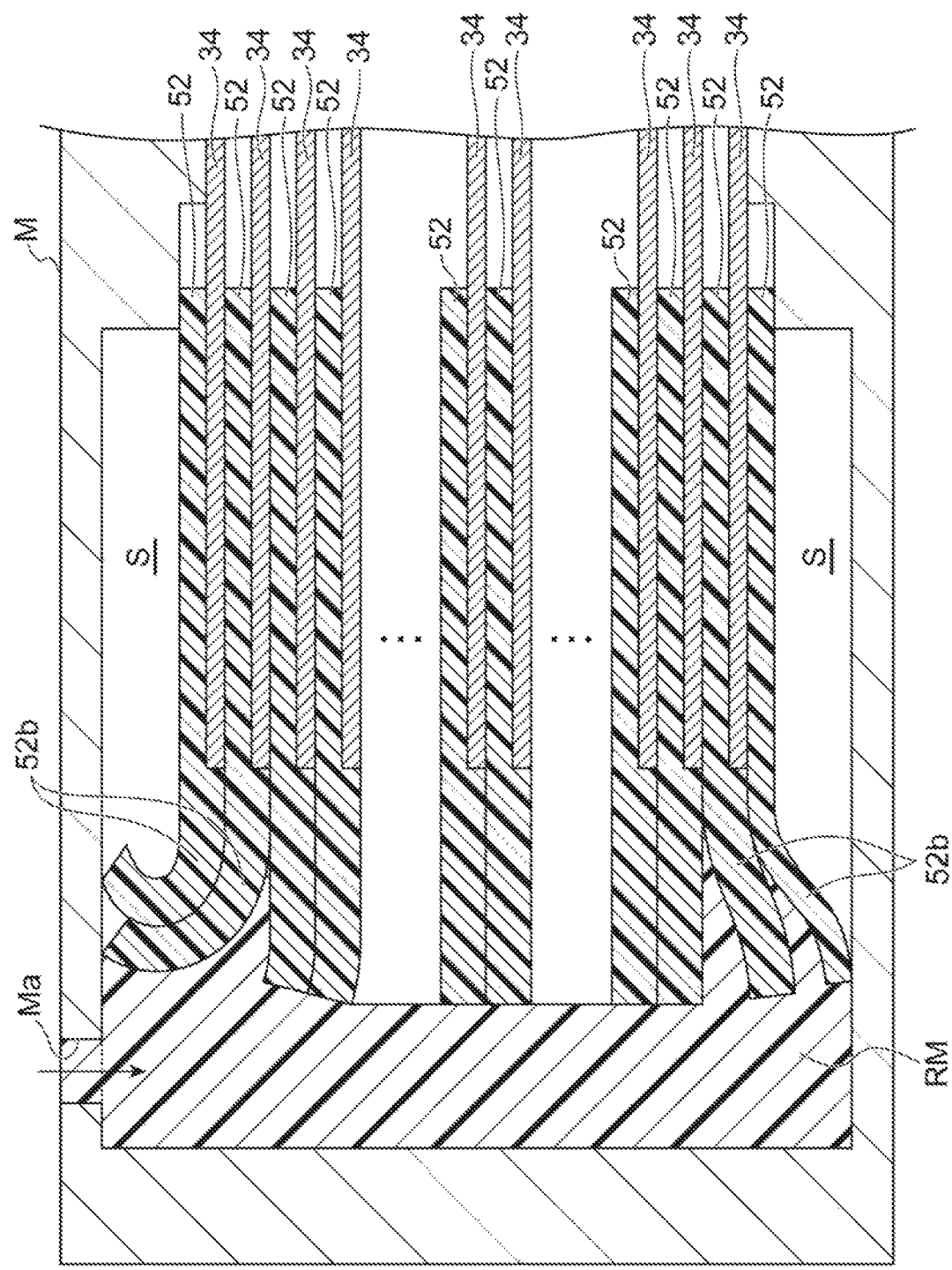
FIG. 7 is a view for describing a process of manufacturing an electricity-storage module according to a comparative example.

The above-described effect will be supplemented with reference to a comparative example illustrated in FIG. 7. The comparative example corresponds to an example in which the injection molding process is carried out immediately after the above-described preparation process. That is, in the comparative example, processing (heating, cutting, or the like) with respect to the extension portions 52*b* of the first sealing portions 52 included in the outer edge portion in the stacking direction D1 of the stacked body 30 is not carried out, and thus the length of the extension portions 52*b* is the same as the length of the extension portion 52*b* of the first sealing portion 52 that is not included in the outer edge portion. Accordingly, in the comparative example, as illustrated in FIG. 7, on both the negative terminal electrode side and the positive terminal electrode side (or on one side thereof), there is a concern that the first sealing portions 52 provided in the terminal electrodes may be rolled up to clog the flow passage into the space S corresponding to the flange portion 54*a*. In the example illustrated in FIG. 7, not only the first sealing portions 52 provided in the terminal electrodes but also the first sealing portions 52 adjacent thereto are rolled up. When this situation occurs, the resin material RM does not appropriately flow into the space S, and thus there is a concern that the second sealing portion 54 (refer to FIG. 3) cannot be appropriately formed. On the other hand, in the method for manufacturing the electricity-storage module according to this embodiment, as described above, the rolling-up of the extension portions 52*b* of the first sealing portions 52 included in the outer edge portion E is suppressed by the processing process, and thus the resin material RM can appropriately flow into the space S corresponding to the flange portion 54*a*.

In addition, in the processing process, the extension portions 52*b* of the plurality of first sealing portions 52 included in the outer edge portion E are heated to weld (join) the extension portions 52*b* adjacent to each other. As described above, the adjacent extension portions 52*b* are welded with heat, and thus it is possible to improve the strength of the extension portions 52*b* of the plurality of first sealing portions 52 included in the outer edge portion E. According to this, it is possible to further suppress deformation (rolling-up or the like) of the extension portions 52*b* of the plurality of first sealing portions 52 included in the outer edge portion E due to a pressure of the resin material RM that flows in at the time of an injection molding process. As a result, it is possible to effectively suppress clogging of the flow passage of the resin material RM into the space corresponding to the flange portion 54*a*.

In addition, in the processing process, the extension portions 52*b* of the plurality of first sealing portions 52 included in the outer edge portion E are processed in such a manner that the length of the extension portions 52*b* of the first sealing portions 52 becomes shorter as the first sealing portions 52 are closer to the stacking end. Processing is performed in such a manner that the length of the extension portions 52*b* (that is, the extension portions 52*b* of the first sealing portions 52 closer to the stacking ends), which are likely to clog the flow passage of the resin material RM into the space S corresponding to the flange portion 54*a*, becomes shorter, and thus it is possible to effectively suppress clogging of the flow passage of the resin material RM into the space S corresponding to the flange portion 54*a*.

The electricity-storage module 12 according to this embodiment includes the stacked body 30 obtained by stacking a plurality of the bipolar electrodes 32 each including the electrode plate 34, the positive electrode 36 provided on one surface of the electrode plate 34, and the negative electrode 38 provided on the other surface of the electrode plate 34, the plurality of first sealing portions 52 each being provided at the edge portion 34*a* of the electrode plate 34 and including the extension portion 52*b* that extends from the end portion 34*b* of the electrode plate 34, and the second sealing portion 54 that is provided at the periphery of the plurality of first sealing portions 52 when viewed from the stacking direction D1 of the stacked body 30 and covers at least parts of outer surfaces of the first sealing portions 52 located at the stacking ends of the stacked body 30 in the stacking direction D1. The length d1 of the extension portions 52*b* of one or a plurality of first sealing portions 52 included in the outer edge portion E in the stacking direction D1 of the stacked body 30 is shorter than the length d2 of the extension portion 52*b* of the first sealing portion 52 that is not included in the outer edge portion E.

In the electricity-storage module 12, the length d1 of the extension portions 52*b* of the one or plurality of first sealing portions 52 included in the outer edge portion E of the stacked body 30 is shorter than the length d2 of the extension portion 52*b* of the first sealing portion 52 that is not included in the outer edge portion E. According to this, at the time of manufacturing the electricity-storage module 12, in the extension portions 52*b* of the one or plurality of first sealing portions 52 included in the outer edge portion E, deformation such as rolling up is further suppressed in comparison to the extension portion 52*b* of the first sealing portion 52 that is not included in the outer edge portion E. As a result, at the time of the injection molding, the extension portions 52*b* of the one or plurality of first sealing portions 52 included in the outer edge portion E are less likely to be rolled up and to clog the flow passage of the resin material RM. That is, at the time of the injection molding, the resin material RM is allowed to easily flow into a space S corresponding to the flange portion 54*a* (in the second sealing portion 54, a portion that covers at least parts of the outer surfaces of the first sealing portions 52 located at the stacking ends of the stacked body 30). As described above, according to the electricity-storage module 12, it is possible to form a sealing member (the first sealing portion 52 and the second sealing portion 54) that seals the side surface 30*a*, of the stacked body 30 with accuracy.

Figure 8:
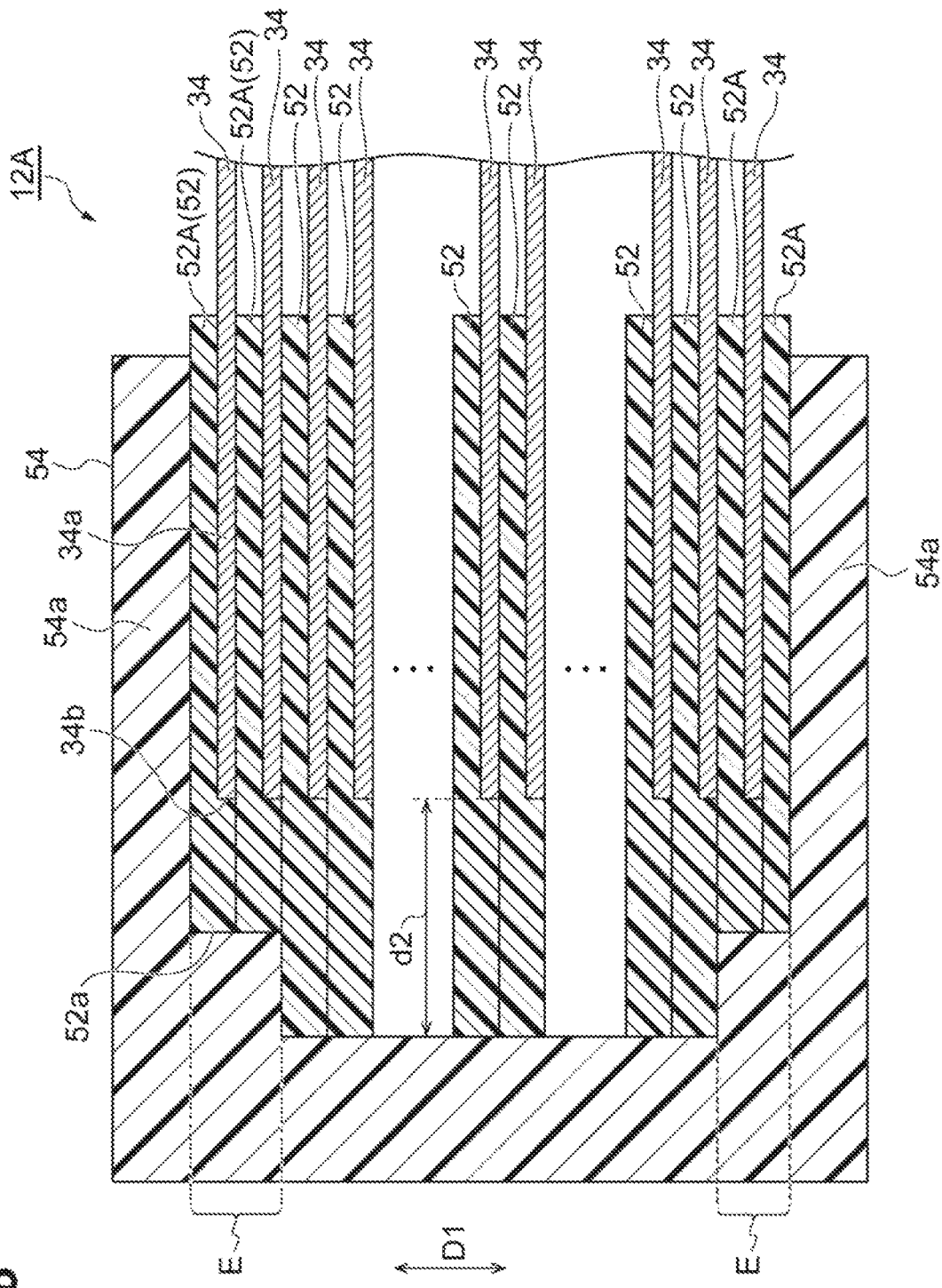
FIG. 8 is a schematic cross-sectional view illustrating an electricity-storage module according to a first modification example.

Hereinbefore, the first embodiment of the invention has been described in detail, but the invention is not limited to the embodiment. For example, as in an electricity-storage module 12A according to a first modification example illustrated in FIG. 8, parts of extension portions 52*b* of a plurality of (here, two) first sealing portions 52A which are respectively included in upper and lower outer edge portions of the stacked body 30 may be cut out along a direction parallel to the stacking direction D1 into a stepped notch shape. Even in this configuration, it is possible to suppress rolling-up of the extension portions 52*b* of the first sealing portions 52A included in the outer edge portions, and it is possible to allow a resin material to easily flow into a space corresponding to the flange portion 54*a* in the injection molding process.

In addition, the shape of the end portions 52*a* of the one or plurality of first sealing portions 52 included in the outer edge portion E is not necessary to be formed through processing by heat, and may be formed, for example, through a cutting process for the extension portions 52*b* of the one or plurality of first sealing portions 52.

Figure 9:
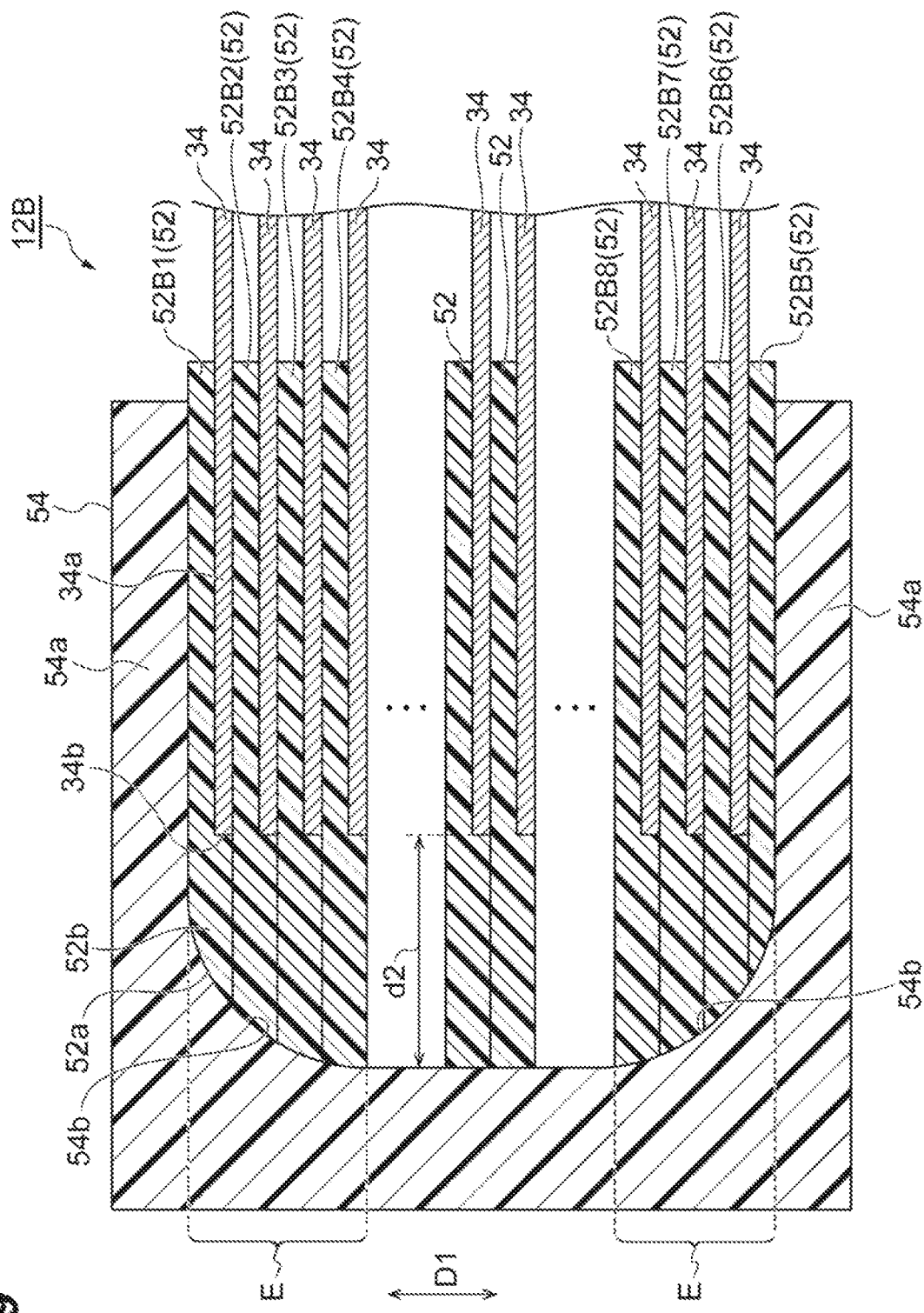
FIG. 9 is a schematic cross-sectional view illustrating an electricity-storage module according to a second modification example.

In addition, as in an electricity-storage module 12B according to a second modification example illustrated in FIG. 9, the end portions 52a of the plurality of first sealing portions 52 included in the outer edge portion E may have an R-shape. That is, a surface formed by the end portions 52a of the plurality of first sealing portions 52 included in the outer edge portion E is not limited to the C-surface formed by the C-surface processing as described above, and may be an R-surface (rounded surface) formed by R-surface processing. For example, the R-surface processing may be performed by pressing a heat plate formed in the R-shape against the end portions 52a of the plurality of first sealing portions 52. However, the R-surface processing may be other processing methods, and may be mechanical cutting processing as an example.

Here, as an example, a part of a region including an extension portion 52b of a first sealing portion 52B1 provided in the negative terminal electrode before processing, and extension portion 52b of three first sealing portions 52B2 to 52B4 provided in three electrode plates 34 adjacent to the negative terminal electrode before processing is removed by the R-surface processing. According to this, the R-surface is formed on end portions 52a of the four first sealing portions 52B1 to 52B4. As a result, in the second sealing portion 54, a portion that is in contact with the end portions 52a of the first sealing portions 52B1 to 52B4, an R-surface portion 54b corresponding to the shape of the end portions 52a of the first sealing portions 52B1 to 51B4 is formed.

Similarly, a part of a region including an extension portion 52b of a first sealing portion 52B5 provided in the positive terminal electrode before processing, and extension portion 52b of three first sealing portions 52B6 to 52B8 provided in three electrode plates 34 adjacent to the positive terminal electrode before processing is removed by the R-surface processing. According to this, the R-surface is formed on end portions 52a of the four first sealing portions 52B5 to 52B8. As a result, in the second sealing portion 54, a portion that is in contact with the end portions 52a of the first sealing portions 52B5 to 52B8, an R-surface portion 54b corresponding to the shape of the end portions 52a of the first sealing portions 52B5 to 52B8 is formed.

Since the R-surface portion 54b is formed in the second sealing portion 54, a pressure-resistant performance of the electricity-storage module 12B can be effectively improved. This will be described in detail with reference to FIG. 10 and FIG. 11.

Figure 10:
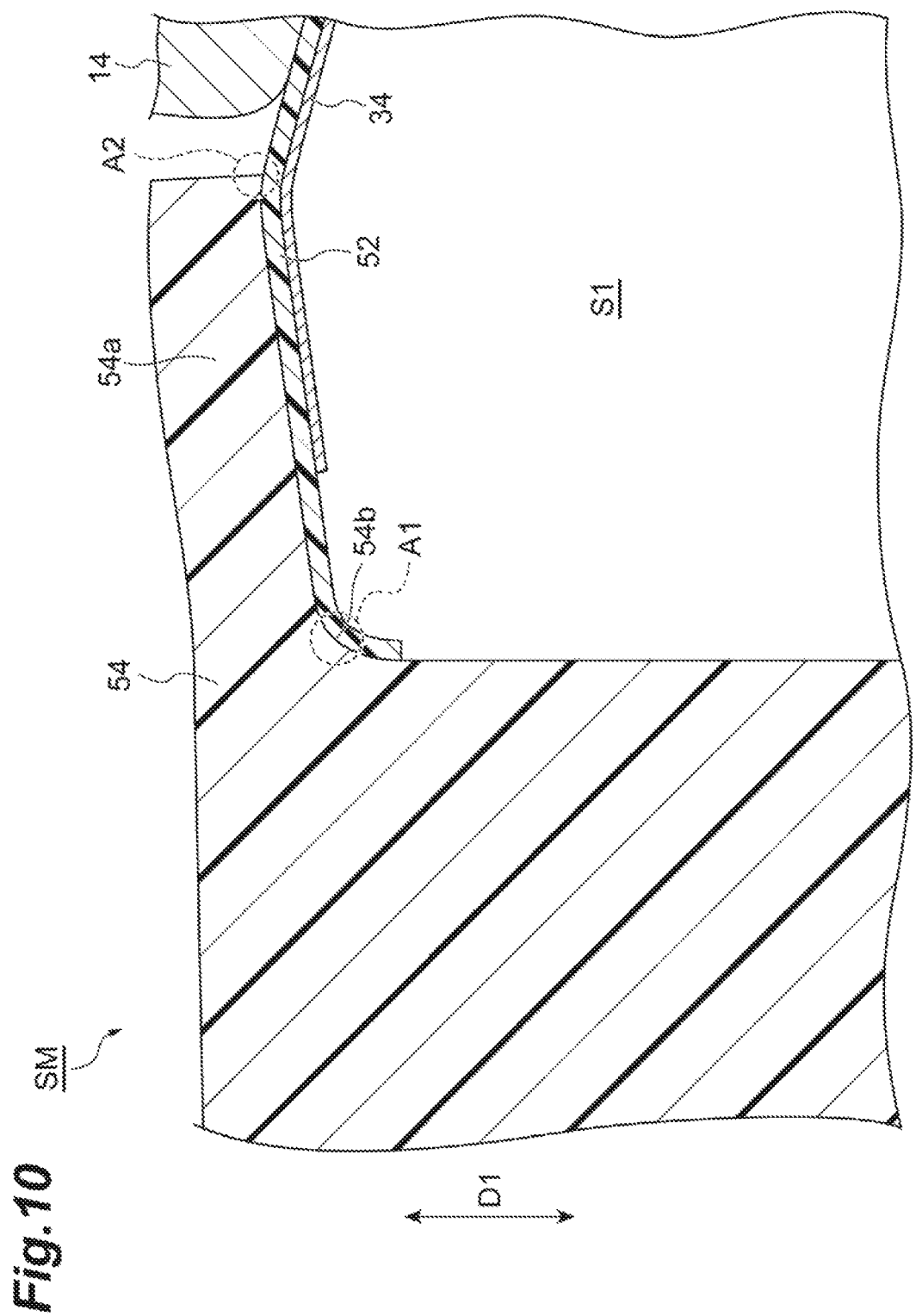
FIG. 10 is a schematic view illustrating an analysis model.

FIG. 10 is a schematic view illustrating an analysis model SM. The analysis model SM is an example of a model that is prepared for simulating an operation when the electrode plate 34 of the positive terminal electrode and the first sealing portion 52 provided in the electrode plate 34 push up the flange portion 54a of the second sealing portion 54 due to an increase in an inner pressure of the electricity-storage module. The analysis model SM is different from a configuration of an actual electricity-storage module. In the analysis model SM, the thickness of the flange portion 54a (length in the stacking direction D1) is set to 1.13 mm. An extension length of the flange portion 54a (a distance between a base end and a tip end of the flange portion 54a) is set to 4.1 mm. A distance between the tip end of the flange portion 54a and the conductive plate 14 is set to 0.5 min. Note that, in the analysis model SM, the first sealing portions 52 and the conductive plate 14 are in contact with each other differently from a configuration of an actual electricity-storage module.

Figure 11:
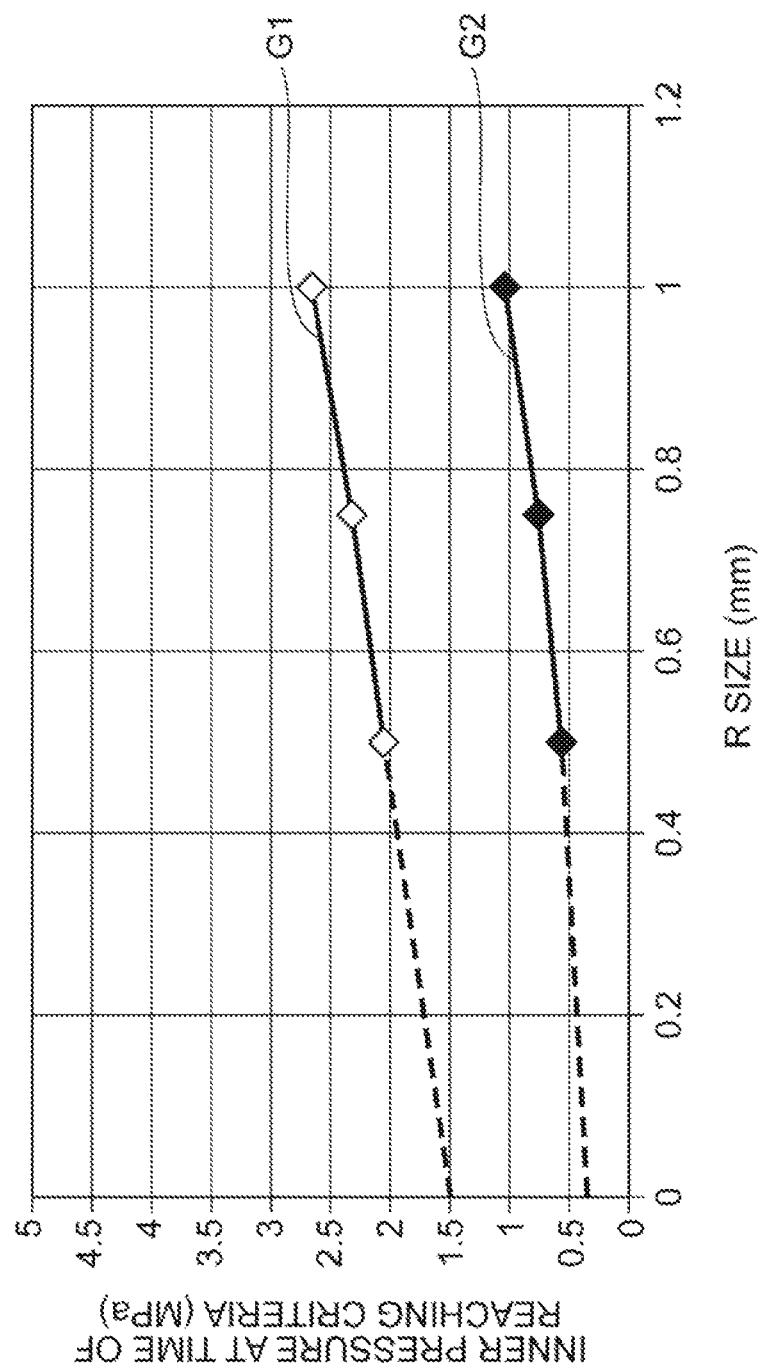
FIG. 11 is a graph showing an analysis result by the analysis model illustrated in FIG. 10.

FIG. 11 is a graph showing an analysis result obtained by the analysis model SM. In the analysis result shown in FIG. 11, with regard to each of a central portion (a region A1 in FIG. 10) of the R-surface portion 54b, and an adhesion portion (a region A2 in FIG. 10) between the first sealing portion 52 and the second sealing portion 54, a relationship between an inner pressure (an inner pressure of an inner space S1 of the analysis model SM) when each portion is fractured (peeled off) (at the time of reaching criteria) and an R size that is a dimension (a radius of a circle) of the R-shape of the R-surface portion 54b is illustrated.

In FIG. 11, a graph G1 shows a relationship between the inner pressure of the inner space S1 and the R size at the time of reaching a criteria of the region A1, and a graph G2 shows a relationship between the inner pressure of the inner space S1 and the R size at the time of reaching a criteria of the region A2. A broken line portion of the graphs G1 and G2 is an estimation value obtained by extrapolation based on a calculation result corresponding to another R size. As shown in FIG. 11, according to the analysis using the analysis model SM, even in any region A1 or A2 that is likely to be influenced by an increase in the inner pressure of the electricity-storage module, an analysis result in which the pressure resistant performance is further improved as the R size of the R-surface portion 54b is great was obtained. Specifically, there is obtained an analysis result indicating that when the R-surface portion 54b having the R size of 1 min is formed, an inner pressure (fracture pressure) when the region A1 is fractured can be raised from approximately 0.4 MPa (estimation value) to approximately 1 MPa, and an inner pressure (fracture pressure) when the region A2 is fractured can be raised from approximately 1.5 MPa (estimation value) to approximately 2.7 MPa in comparison to a case where the R-surface portion 54b is not provided (in a case where the R size is 0).

Note that, in the electricity-storage module 12B, an aspect in which a smooth R-shape is formed by the end portions 52a of the plurality of (here, four) first sealing portions 52 is exemplified, but the R-shape formed by the end portions 52a of the plurality of first sealing portions 52 may be a pseudo-R shape formed in a stepped shape.

Second Embodiment

Figure 12:
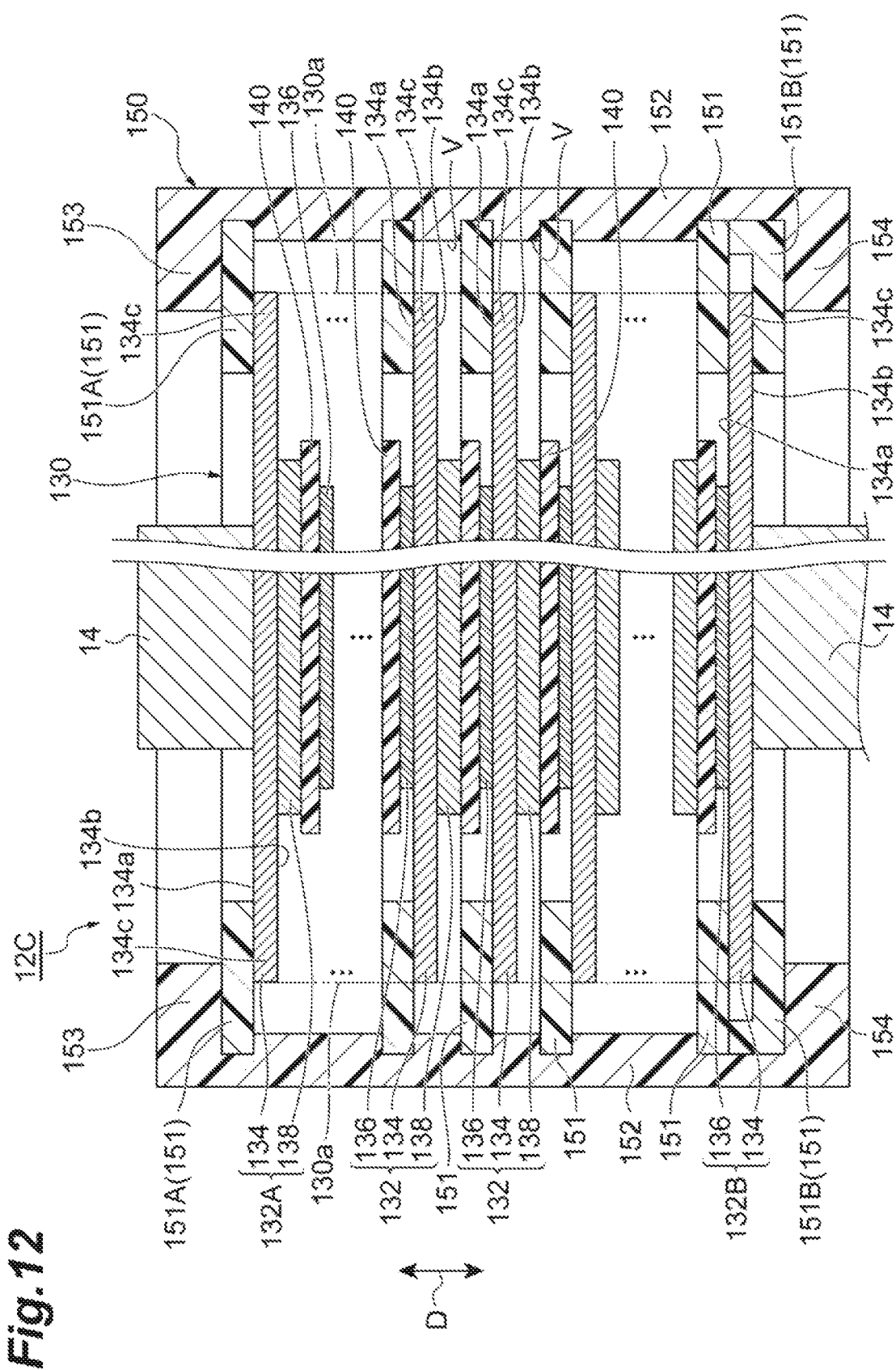
FIG. 12 is a schematic cross-sectional view illustrating an embodiment of an electricity-storage module according to a second embodiment.

As illustrated in FIG. 12, an electricity-storage module 12C according to a second embodiment includes a stacked body 130, and a frame 150 (sealing portion) provided in the stacked body 130 to surround edge portions of electrodes (a plurality of bipolar electrodes 132, a negative terminal electrode 132A, and a positive terminal electrode 132B) when viewed from a stacking direction D. The stacking direction D of the stacked body 130 matches the stacking direction D of the electricity-storage device 10. The stacked body 130 includes a side surface 130a that extends in the stacking direction D.

As in the bipolar electrodes 32, each of the bipolar electrodes 132 includes an electrode plate 134, a positive electrode 136 provided on a first surface 134a of the electrode plate 134, and a negative electrode 138 provided on a second surface 134b of the electrode plate 134 which is opposite to the first surface 134a. As in the positive electrode 36, the positive electrode 136 is a positive electrode active material layer that is formed by coating the electrode plate 134 with a positive electrode active material. As in the negative electrode 38, the negative electrode 138 is a negative electrode active material layer that is formed by coating the electrode plate 134 with a negative electrode active material. In the stacked body 130, the positive electrode 136 of one of the bipolar electrodes 132 faces the negative electrode 138 of another bipolar electrode 132 that is adjacent in the stacking direction D with a separator 140 interposed therebetween. In the stacked body 130, the negative electrode 138 of one of the bipolar electrodes 132 faces the positive electrode 136 of another bipolar electrode 132 that is adjacent in the stacking direction D with the separator 140 interposed therebetween.

The negative terminal electrode 132A includes the electrode plate 134 and the negative electrode 138 provided on the second surface 134b of the electrode plate 134. The negative terminal electrode 132A is disposed at one end in the stacking direction D in such a manner that the second surface 134b becomes an inner side (central side with respect to the stacking direction D) of the stacked body 130. The negative electrode 138 of the negative terminal electrode 132A faces the positive electrode 136 of the bipolar electrode 132 at one end in the stacking direction D through the separator 140 similar to the separator 40. The positive terminal electrode 132B includes the electrode plate 134 and the positive electrode 136 provided on the first surface 134a of the electrode plate 134. The positive terminal electrode 132B is disposed at the other end in the stacking direction D in such a manner that the first surface 134a becomes an inner side of the stacked body 130. The positive electrode 136 of the positive terminal electrode 132B faces the negative electrode 138 of the bipolar electrode 132 at the other end in the stacking direction D through the separator 140.

A conductive plate 14 is in contact with the first surface 134a of the electrode plate 134 of the negative terminal electrode 132A. In addition, another conductive plate 14 adjacent to the electricity-storage module 12C is in contact with the second surface 134b of the electrode plate 134 of the positive terminal electrode 132B. A binding load applied from a binding member 16 is applied to the stacked body 130 from the negative terminal electrode 132A and the positive terminal electrode 132B through the conductive plates 14. That is, the conductive plates 14 function also as a binding member that applies the binding load to the stacked body 130 along the stacking direction D.

For example, the frame 150 is formed from an insulating resin in a rectangular tube shape as a whole. The frame 150 is provided in a side surface 130a of the stacked body 130 to surround edge portions 134c of the electrode plates 134. The frame 150 holds the edge portions 134c at the side surface 130a. The frame 150 includes a plurality of first sealing portions 151 which are welded to the edge portions 134c, and a single second sealing portion 152 that is joined to the first sealing portion 151 to surround the first sealing portions 151 from an outer side along the side surfaces 130a.

The first sealing portion 151 have a rectangular annular shape when viewed from the stacking direction D and are continuously provided over the entire periphery of the edge portions 134c. Each of the first sealing portions 151 is welded to the first surface 134a of each of the electrode plates 134, and is air-tightly joined thereto. For example, the first sealing portion 151 is welded with ultrasonic waves or heat. The first sealing portion 151 is a film having a predetermined thickness (length in the stacking direction D). An end surface of the electrode plate 134 is exposed from the first sealing portion 151. In the first sealing portion 151, a part on an inner side is located between the edge portions 134c of the electrode plates 134 adjacent to each other in the stacking direction D, and a part on an outer side extends from the electrode plate 134 to an outer side. In the first sealing portion 151, the part on the outer side is buried in the second sealing portion 152. The first sealing portions 151 adjacent to each other along the stacking direction D are spaced apart from each other.

The second sealing portion 152 is provided on an outer side of the stacked body 130 and the first sealing portions 151, and constitutes an outer wall (casing) of the electricity-storage module 12C. For example, the second sealing portion 152 is formed by resin injection molding, and extends over the entire length of the stacked body 130 along the stacking direction D. The second sealing portion 152 has a tubular shape (annular shape) that extends with the stacking direction D set as an axial direction. For example, the second sealing portion 152 is welded (joined) to outer surfaces of the first sealing portions 151 with heat at the time of the injection molding.

The second sealing portion 152 seals a gap between the bipolar electrodes 132 adjacent to each other along the stacking direction D, a gap between the negative terminal electrode 132A and the bipolar electrode 132 adjacent to each other along the stacking direction D, and a gap between the positive terminal electrode 132B and the bipolar electrode 132 adjacent to each other along the stacking direction D in combination with the first sealing portions 151. According to this, an inner space V that is air-tightly partitioned is formed between the bipolar electrodes 132, between the negative terminal electrode 132A and the bipolar electrode 132, and between the positive terminal electrode 132B and the bipolar electrode 132. For example, the inner space V stores an electrolytic solution (not illustrated) composed of an aqueous alkali solution such as an aqueous solution of potassium hydroxide. The separator 140, the positive electrode 136, and the negative electrode 138 are impregnated with the electrolytic solution.

For example, the first sealing portions 151 and the second sealing portion 152 may be constituted with polypropylene (PP), polyphenylene sulfide (PPS), and modified polyphenylene ether (modified PPE) which are insulating resins.

The second sealing portion 152 includes a first flange portion 153 that is joined to a first terminal sealing portion 151A that is the first sealing portion 151 provided in the edge portion of the negative terminal electrode 132A at one end in the stacking direction D. The first terminal sealing portion 151A is welded to the first surface 134a of the electrode plate 134 of the negative terminal electrode 132A. The first flange portion 153 includes a portion that overlaps the first terminal sealing portion 151A when viewed from the stacking direction D. The first flange portion 153 is formed in a rectangular annular shape that extends to an inner side at one end of the stacked body 130 when viewed from the stacking direction D. The first flange portion 153 is in contact with an outer surface (a surface opposite to the surface of the 134 which is welded to the first surface 134a of the electrode plate 134) of the first terminal sealing portion 151A. The first flange portion 153 is welded to the outer surface of the first terminal sealing portion 151A.

The second sealing portion 152 includes a second flange portion 154 that is joined to a second terminal sealing portion 151B that is the first sealing portion 151 provided in the edge portion of the positive terminal electrode 132B at the other end in the stacking direction D. The second terminal sealing portion 151B is welded to the second surface 134b of the electrode plate 134 of the positive terminal electrode 132B. The second flange portion 154 includes a portion that overlaps the second terminal sealing portion 151B when viewed from the stacking direction D. The second flange portion 154 is formed in a rectangular annular shape that extends to an inner side at the other end of the stacked body 130 when viewed from the stacking direction D. The second flange portion 154 is in contact with an outer surface (a surface opposite to the surface of the 134 which is welded to the second surface 134b of the electrode plate 134) of the second terminal sealing portion 151B. The second flange portion 154 is welded to the outer surface of the second terminal sealing portion 151B.

Figure 13:
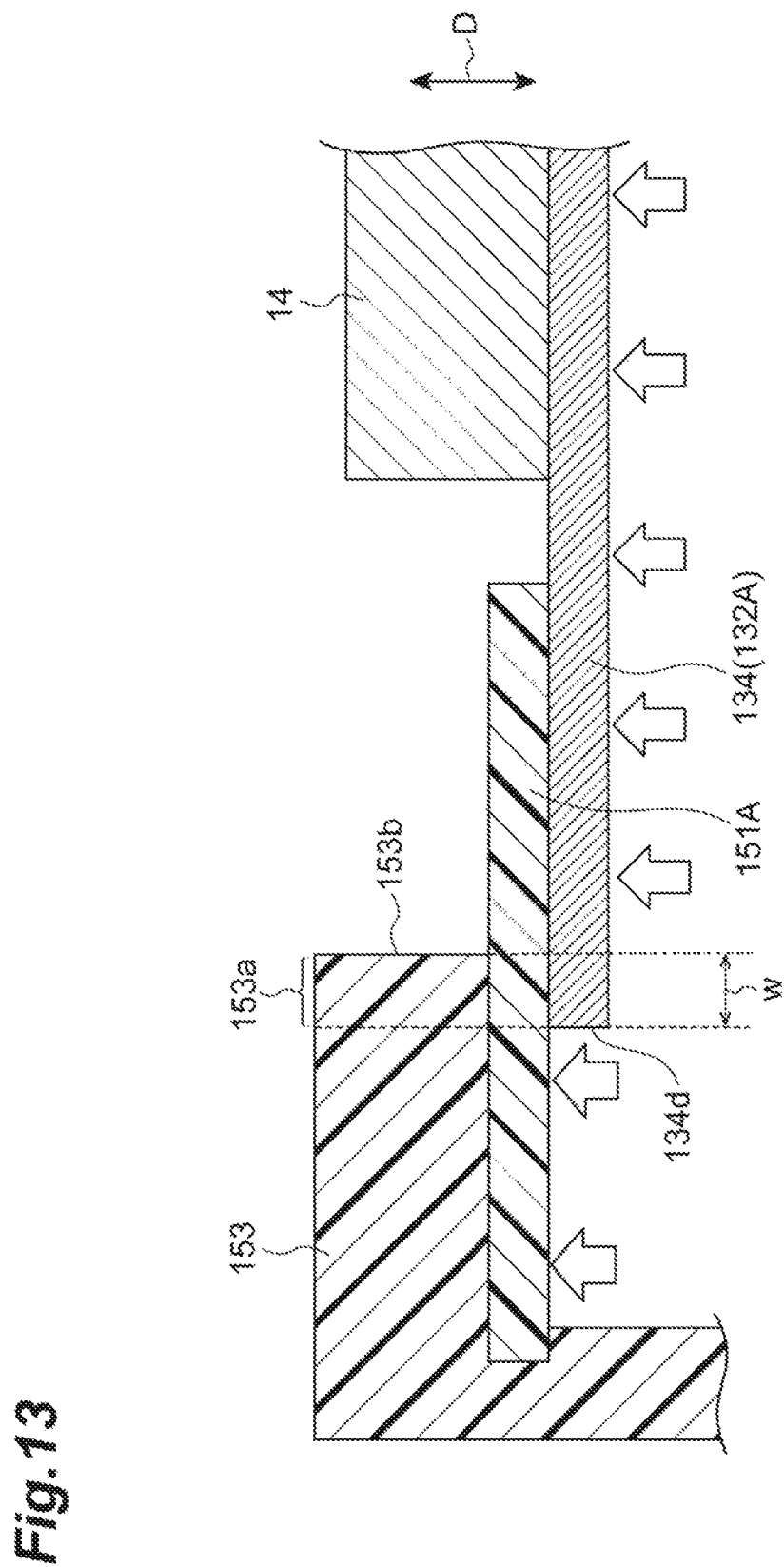
FIG. 13 is an enlarged cross-sectional view of a main portion of the electricity-storage module illustrated in FIG. 12.

As illustrated in FIG. 13, the first flange portion 153 and the negative terminal electrode 132A include portions 153a overlapping each other when viewed from the stacking direction D. That is, an inner end 153b of the first flange portion 153 is located on an inner side in comparison to an end 134d of the electrode plate 134 of the negative terminal electrode 132A when viewed from the stacking direction D. The portions 153a are formed in a rectangular frame shape over the entire periphery of the edge portion of the electrode plate 134 of the negative terminal electrode 132A when viewed from the stacking direction D. A width w of the portions 153a (that is, a width of a portion where the first flange portion 153, the first terminal sealing portion 151A, and the negative terminal electrode 132A overlap each other when viewed from the stacking direction D) is set to, for example, approximately 10 times the thickness (a length in the stacking direction D) of the first terminal sealing portion 151A.

Here, when being used, the electricity-storage module 12C generates a gas at the inside thereof (each inner space V). An inner pressure inside the electricity-storage module 12C is raised due to the gas. When the inner pressure is raised, at an outermost layer of the stacked body 130 (one end or the other end of the stacked body 130), a pressure is applied from an inner side to an outer side along the stacking direction D due to a structure of the electricity-storage module 12C (refer to an arrow in FIG. 13). In this case, among members disposed in the outermost layer of the stacked body 130, the first sealing portion 151 (the first terminal sealing portion 151A or the second terminal sealing portion 151B) having relatively low strength becomes a weak portion. In addition, for example, when the weak portion receives the pressure and is deformed from the inner side to the outer side, there is a high possibility that the electrolytic solution stored inside the electricity-storage module 12C may be leaked from the deformed portion.

On the other hand, in the above-described electricity-storage module 12C, a set of the first flange portion 153 and the negative terminal electrode 132A includes portions overlapping each other when viewed from the stacking direction D (portions overlapping the portions 153a when viewed from the stacking direction D). That is, respective members (the set of the first flange portion 153 and the negative terminal electrode 132A) are disposed so as not to receive the pressure only with the weak portion (the first terminal sealing portion 151A). According to this, the pressure-resistant strength of the electricity-storage module 12C is improved, and deformation of the weak portion is suppressed. As a result, the possibility of leakage of the electrolytic solution as described above is reduced. Accordingly, according to the electricity-storage module 12C, it is possible to effectively suppress leakage of the electrolytic solution.

Note that, in this embodiment, as in the set of the first flange portion 153 and the negative terminal electrode 132A, a set of the second flange portion 154 and the positive terminal electrode 132B also include portions (overlapping portions) which overlap each other when viewed from the stacking direction D. In this manner, the overlapping portions exist on both the negative terminal electrode 132A side and the positive terminal electrode 132B side, it is possible to effectively improve the pressure-resistant strength of the electricity-storage module 12C. According to this, it is possible to improve a binding pressure in the stacking direction D of the electricity-storage module 12C, and as a result, it is possible to effectively suppress leakage of the electrolytic solution on the negative terminal electrode 132A side or the positive terminal electrode 132B side. However, at least one set between the set of the first flange portion 153 and the negative terminal electrode 132A and the set of the second flange portion 154 and the positive terminal electrode 132B may include portions overlapping each other when viewed from the stacking direction D. Even in this case, it is possible to realize an improvement in the pressure-resistant strength and the binding pressure of the electricity-storage module 12C, and as a result, it is possible to suppress leakage of the electrolytic solution.

In addition, in the electricity-storage module 12C in which an aqueous alkali solution is used as the electrolytic solution, leakage of the electrolytic solution is likely to occur from the negative-electrode side end (the other end) of the stacked body 130 due to a so-called alkali creep phenomenon. According to this, as in the electricity-storage module 12C, according to the configuration in which at least the first flange portion 153 and the negative terminal electrode 132A include portions overlapping each other when viewed from the stacking direction D, the binding pressure can be raised by improving the pressure-resistant strength at the negative-electrode side end of the electricity-storage module 12C, and thus it is possible to further effectively suppress leakage of the electrolytic solution due to an alkali creep phenomenon.

In addition, it is preferable that the width w of the portions 153a (that is, a width of portion where the first flange portion 153, the first terminal sealing portion 151A, and the negative terminal electrode 132A overlap each other when viewed from the stacking direction D) is set to a size at which the pressure-resistant strength of the electricity-storage module 12C enters a saturated state (a state in which the pressure-resistant strength does not increase to a certain extent or greater along with an increase amount of the width w). When the size (width w) of the overlapping portion is set to a necessary and sufficient size, it is possible to reduce the material cost of the second sealing portion 152.

Hereinbefore, the first embodiment and the second embodiment of the invention have been described, but even in any of the first embodiment and the second embodiment, leakage of the electrolytic solution in the electricity-storage module can be effectively suppressed. In addition, the first embodiment and the second embodiment may be combined with each other. In this case, it is possible to obtain effects of both the first embodiment and the second embodiment.

REFERENCE SIGNS LIST

10: electricity-storage device, 12, 12A, 12B, 12C: electricity-storage module, 30, 130: stacked body, 30a, 130a: side surface, 32, 132: bipolar electrode, 34, 134: electrode plate, 34a: edge portion, 34b: end portion, 36, 136: positive electrode, 38, 138: negative electrode, 50, 150: frame, 52, 52A, 52B1 to 52B8, 151, 521 to 528: first sealing portion, 52b: extension portion, 54, 152: second sealing portion, 54a: flange portion, 54b: R-surface portion, 132A: negative terminal electrode, 132B: positive terminal electrode, 151A: first terminal sealing portion, 151B: second terminal sealing portion, 153: first flange portion, 154: second flange portion, D1: stacking direction, E, E1, E2: outer edge portion, M: mold frame, RM: resin material.

The invention claimed is:

1. An electricity-storage module, comprising:
a stacked body that is obtained by stacking a plurality of electrodes; and
a sealing portion that is provided in the stacked body to surround edge portions of the plurality of electrodes when viewed from a stacking direction of the stacked body,
wherein the plurality of electrodes include a plurality of bipolar electrodes, a negative terminal electrode, and a positive terminal electrode,
each of the plurality of bipolar electrodes includes an electrode plate, a positive electrode provided on a first surface of the electrode plate, and a negative electrode provided on a second surface of the electrode plate which is opposite to the first surface,
the negative terminal electrode includes the electrode plate and the negative electrode provided on the second surface of the electrode plate, and is disposed at one end of the stacked body in the stacking direction in such a manner that the second surface is located on an inner side of the stacked body,
the positive terminal electrode includes the electrode plate and the positive electrode provided on the first surface of the electrode plate, and is disposed at the other end of the stacked body in the stacking direction in such a manner that the first surface is located on an inner side of the stacked body,
the sealing portion includes a plurality of first sealing portions which are respectively provided at edge portions of the plurality of electrodes, and a second sealing portion that is joined to the plurality of first sealing portions to surround the plurality of first sealing portions when viewed from the stacking direction,
the second sealing portion includes:
a first flange portion that is in contact with a first terminal sealing portion that is one of the plurality of first sealing portions which is provided at an edge portion of the negative terminal electrode at one end of the stacked body, and includes a portion that overlaps the first terminal sealing portion when viewed from the stacking direction; and
a second flange portion that is in contact with a second terminal sealing portion that is one of the plurality of first sealing portions which is provided at an edge portion of the positive terminal electrode at the other end of the stacked body, and includes a portion that overlaps the second terminal sealing portion when viewed from the stacking direction, wherein
the first flange portion, the first terminal sealing portion, and the electrode plate of the negative terminal electrode include first portions overlapping each other when viewed from the stacking direction, and
the second flange portion, the second terminal sealing portion, and the electrode plate of the positive terminal electrode include second portions overlapping each other when viewed from the stacking direction.

2. The electricity-storage module according to claim 1, wherein at least the first flange portion and the negative terminal electrode include portions overlapping each other when viewed from the stacking direction.

3. The electricity-storage module according to claim 1, wherein each of the plurality of first sealing portions includes an extension portion that extends from an end portion of the electrode plate, and
a length of the extension portion of the one or the plurality of first sealing portions included in an outer edge portion in a stacking direction of the stacked body is shorter than a length of the extension portion of the one or the plurality of first sealing portions which are not included in the outer edge portion.

4. An electricity-storage module, comprising:
a stacked body that is obtained by stacking a plurality of electrodes; and
a sealing portion that is provided in the stacked body to surround edge portions of the plurality of electrodes when viewed from a stacking direction of the stacked body,
wherein the plurality of electrodes include a plurality of bipolar electrodes, a negative terminal electrode, and a positive terminal electrode,
each of the plurality of bipolar electrodes includes an electrode plate, a positive electrode provided on a first surface of the electrode plate, and a negative electrode provided on a second surface of the electrode plate which is opposite to the first surface,
the negative terminal electrode includes the electrode plate and the negative electrode provided on the second surface of the electrode plate, and is disposed at one end of the stacked body in the stacking direction in such a manner that the second surface is located on an inner side of the stacked body,
the positive terminal electrode includes the electrode plate and the positive electrode provided on the first surface of the electrode plate, and is disposed at the other end of the stacked body in the stacking direction in such a manner that the first surface is located on an inner side of the stacked body,
the sealing portion includes a plurality of first sealing portions which are respectively provided at edge portions of the plurality of electrodes, and a second sealing portion that is joined to the plurality of first sealing portions to surround the plurality of first sealing portions when viewed from the stacking direction,
the second sealing portion includes:
a first flange portion that is in contact with a first terminal sealing portion that is one of the plurality of first sealing portions which is provided at an edge portion of the negative terminal electrode at one end of the stacked body, and includes a portion that overlaps the first terminal sealing portion when viewed from the stacking direction; and
a second flange portion that is in contact with a second terminal sealing portion that is one of the plurality of first sealing portions which is provided at an edge portion of the positive terminal electrode at the other end of the stacked body, and includes a portion that overlaps the second terminal sealing portion when viewed from the stacking direction,
at least one set between a set of the first flange portion and the negative terminal electrode, and a set of the second flange portion and the positive terminal electrode includes portions overlapping each other when viewed from the stacking direction, wherein
each of the plurality of first sealing portions includes an extension portion that extends from an end portion of the electrode plate, and
a length of the extension portion of the one or the plurality of first sealing portions included in an outer edge portion in a stacking direction of the stacked body is shorter than a length of the extension portion of the one or the plurality of first sealing portions which are not included in the outer edge portion.

\* \* \* \* \*